(12) United States Patent
Yi

(10) Patent No.: US 10,960,811 B2
(45) Date of Patent: Mar. 30, 2021

(54) VEHICLE INTERIOR CABIN FORWARD FACING BRAKE LIGHT

(71) Applicant: Yong Guk Yi, Corona, CA (US)

(72) Inventor: Yong Guk Yi, Corona, CA (US)

( * ) Notice: Subject to any disclaimer, the term of this patent is extended or adjusted under 35 U.S.C. 154(b) by 0 days.

(21) Appl. No.: 16/779,679

(22) Filed: Feb. 3, 2020

(65) Prior Publication Data

US 2020/0282895 A1    Sep. 10, 2020

Related U.S. Application Data

(63) Continuation-in-part of application No. 16/734,332, filed on Jan. 4, 2020, now Pat. No. 10,821,885, which is a continuation-in-part of application No. 15/958,335, filed on Apr. 20, 2018, now abandoned.

(51) Int. Cl.
*B60Q 1/50* (2006.01)
*B60Q 1/08* (2006.01)
*F21S 41/143* (2018.01)
*F21S 9/03* (2006.01)
*F21Y 115/10* (2016.01)

(52) U.S. Cl.
CPC .............. *B60Q 1/085* (2013.01); *F21S 9/037* (2013.01); *F21S 41/143* (2018.01); *B60Q 2300/114* (2013.01); *F21Y 2115/10* (2016.08)

(58) Field of Classification Search
CPC ..................................................... B60Q 1/085
USPC ................ 340/407, 435, 438, 467, 463, 479
See application file for complete search history.

(56) References Cited

U.S. PATENT DOCUMENTS

| | | |
|---|---|---|
| D303,016 S | 8/1989 | Yuen |
| D313,661 S | 1/1991 | Kang |
| D316,230 S | 4/1991 | Munoz |
| 5,150,098 A | 9/1992 | Rakow |
| D332,837 S | 1/1993 | Kim |
| 5,373,426 A | 12/1994 | O'Sullivan |
| 5,580,153 A | 12/1996 | Motz |
| D393,913 S | 4/1998 | Edsall |
| D451,218 S | 11/2001 | Bernier |
| D526,430 S | 8/2006 | Hernandez |
| 10,267,478 B2 * | 4/2019 | Fogg ............... B60Q 1/2611 |
| D850,679 S | 6/2019 | Chi-Chung |

(Continued)

OTHER PUBLICATIONS

Lyft.com website Article regarding Driver Dash Board Light "AMP" https://help.lyft.com/hc/en-us/articles/115012925587-Amp#eligibility author, date published unknown.

*Primary Examiner* — Tai T Nguyen
(74) *Attorney, Agent, or Firm* — Alexander Chen, Esq.

(57) ABSTRACT

A system to enhance vehicle safety is disclosed comprising a vehicle having a front end and a rear end; at least one visual signal light apparatus positioned in the proximity to the front end of the vehicle; the visual signal light apparatus illuminates when the vehicle's is decelerating via its braking system; wherein the visual light apparatus is comprised of at least a main component and a mount component; wherein the mount component is suitable to mount the main component to a surface of the front of the vehicle; wherein the main component is comprised of a housing, an LED array, and a solar array; wherein the housing is comprised of a recessed portion housing the LED array; wherein the LED array faces the front end of the vehicle; and wherein the solar array is embodied to a top surface of the housing.

7 Claims, 23 Drawing Sheets

(56) References Cited

U.S. PATENT DOCUMENTS

| | | | |
|---|---|---|---|
| 2002/0130773 A1* | 9/2002 | Santa Cruz | B60Q 1/442 |
| | | | 340/479 |
| 2019/0111833 A1* | 4/2019 | Nielsen | B60Q 1/0041 |
| 2019/0143888 A1* | 5/2019 | Schaye | F21S 43/15 |
| | | | 315/79 |

* cited by examiner

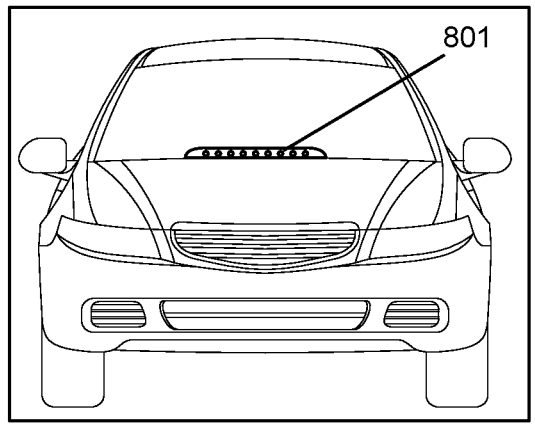
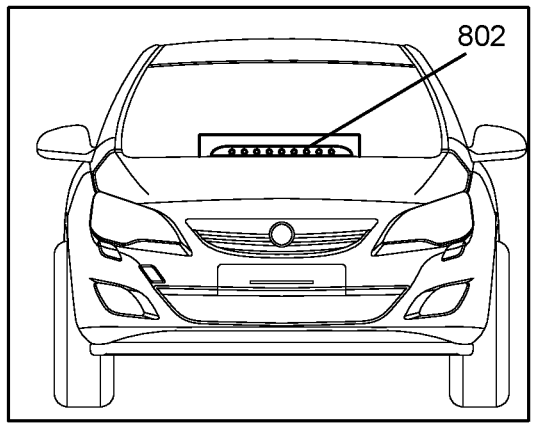
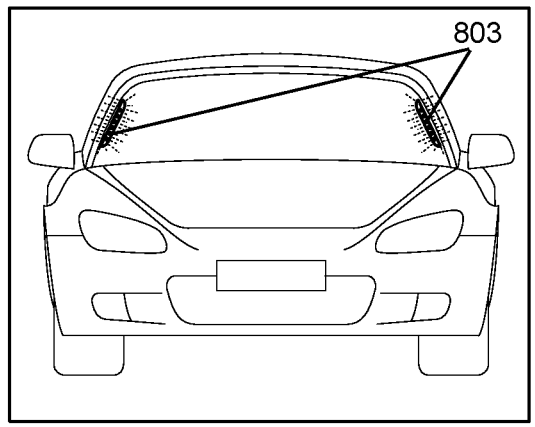
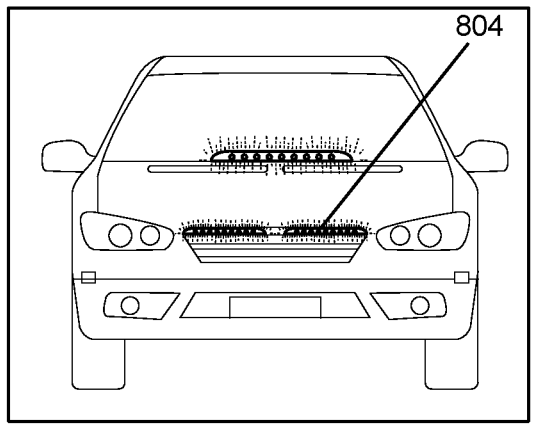
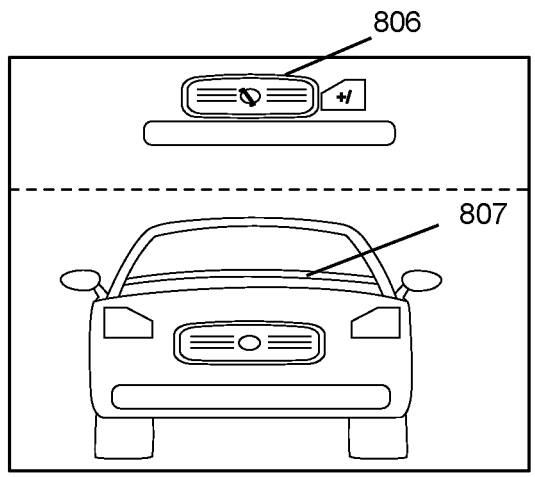
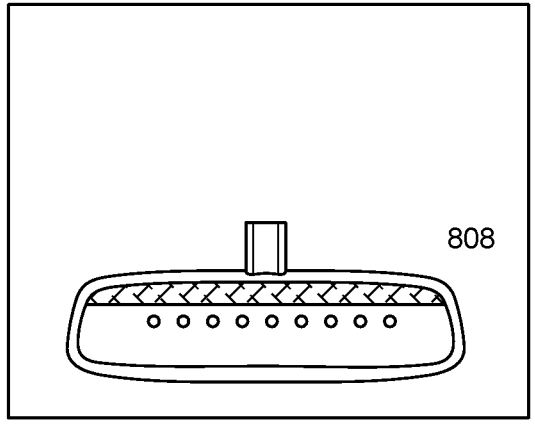
FIG. 8

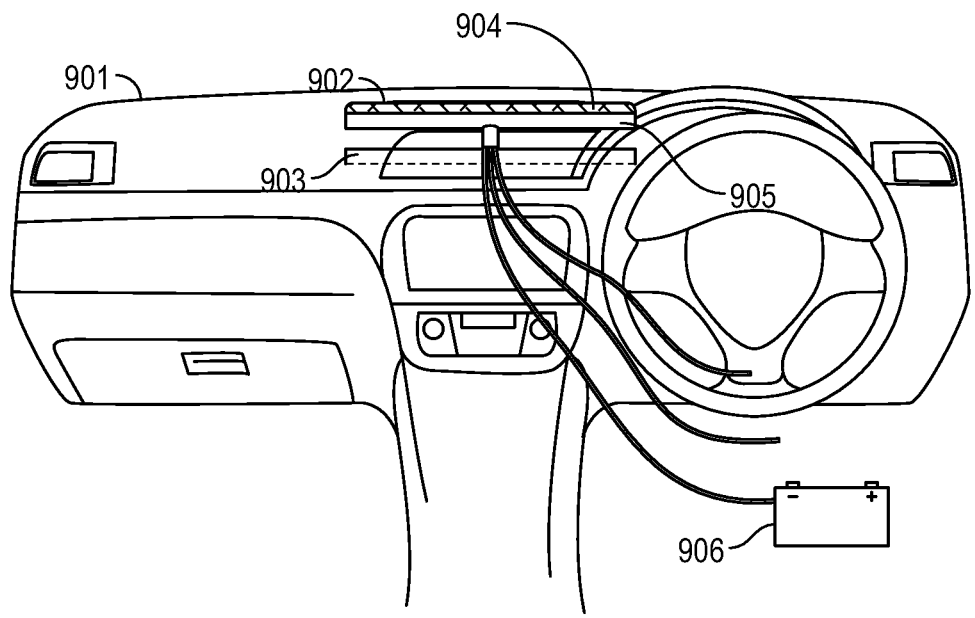
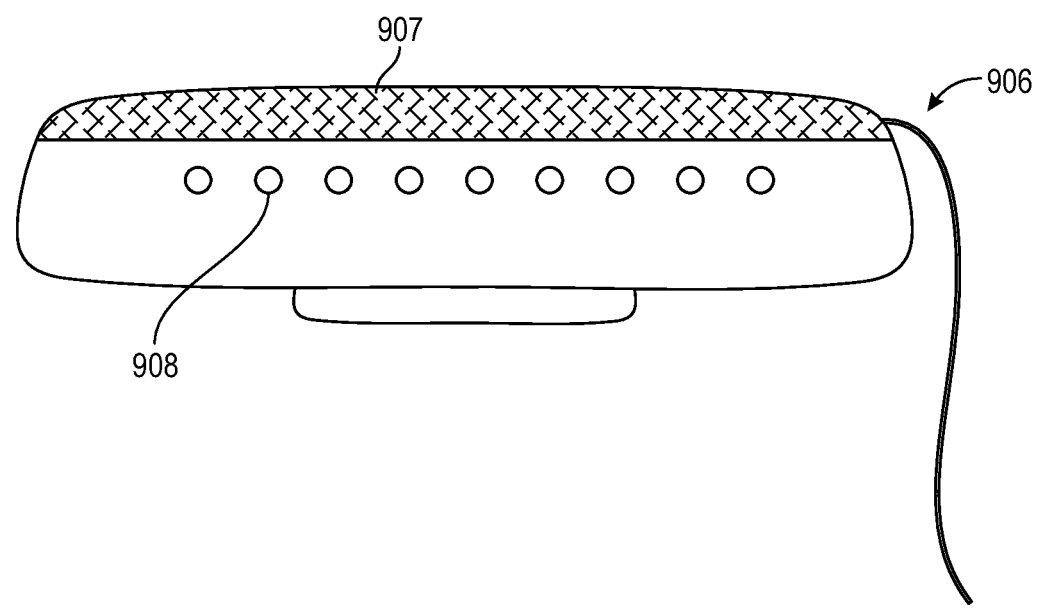
FIG. 9

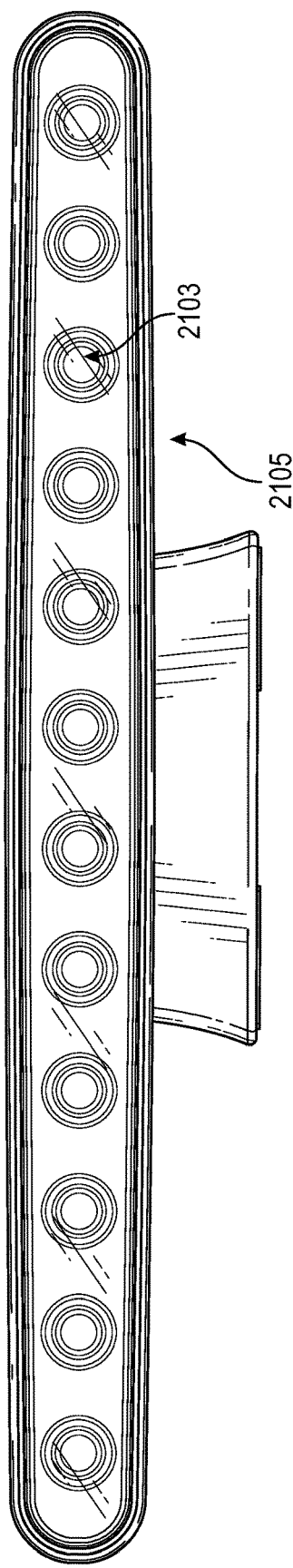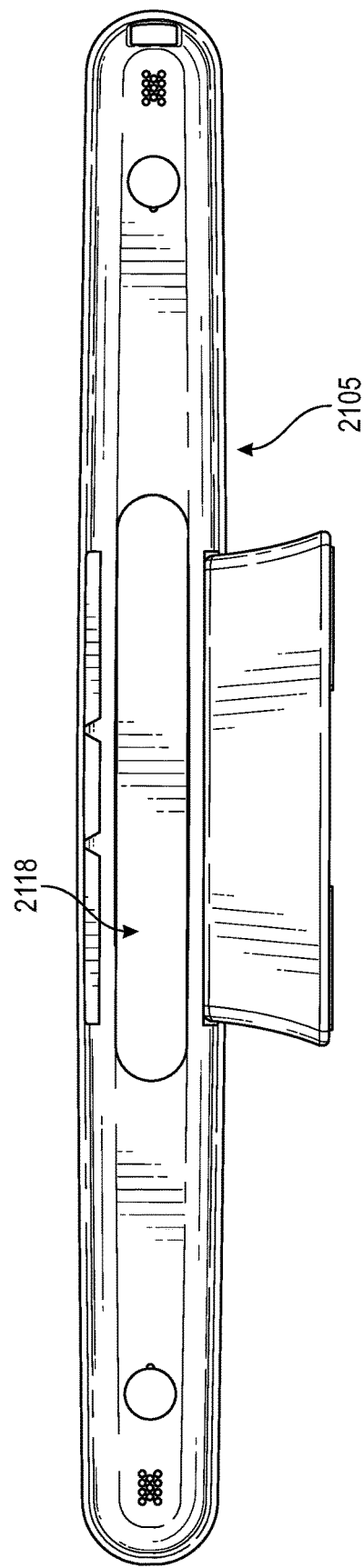
FIG. 15
FIG. 16

2107

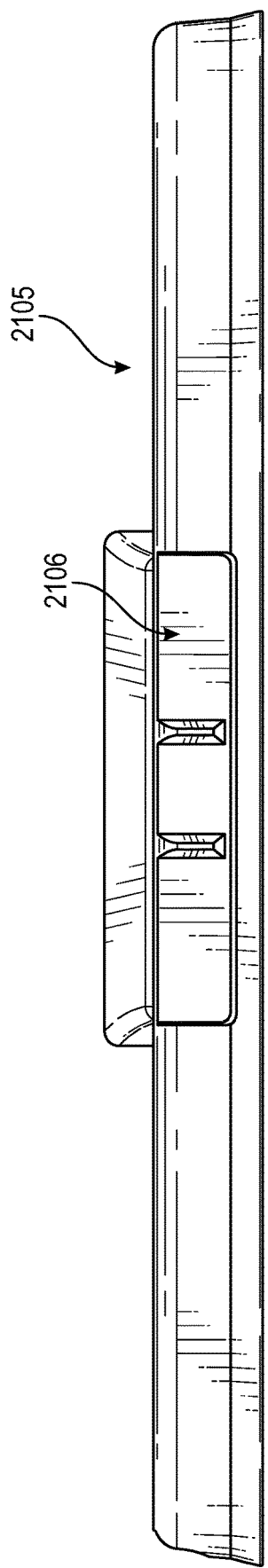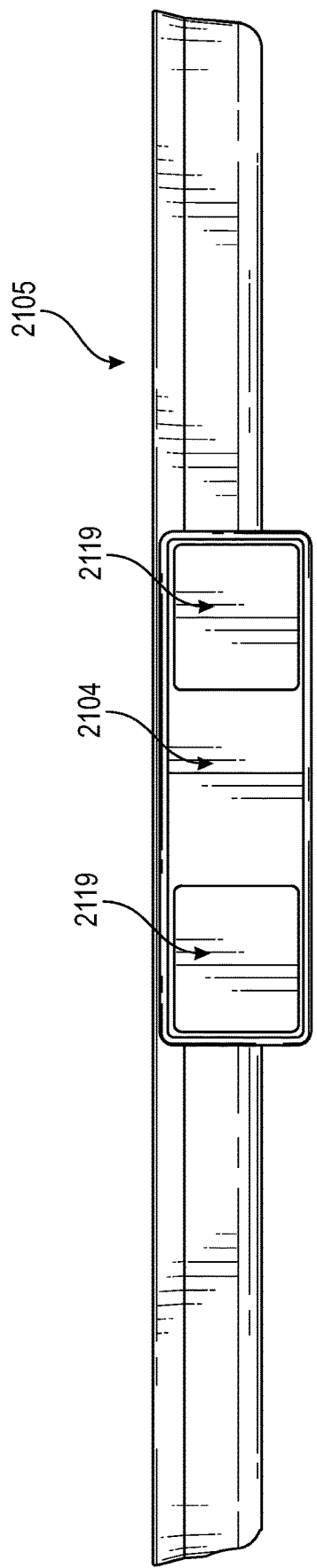

VEHICLE INTERIOR CABIN FORWARD FACING BRAKE LIGHT

INCORPORATION BY REFERENCE

This application is a continuation-in-part application of and, thus, claims the benefits of priority under 35 U.S.C. 121 to the filing date of U.S. application Ser. No. 16/734,332, entitled "Enhanced Vehicle Safety System," filed on Jan. 4, 2020, now U.S. Pat. No. 10,821,885, which, in turn, claims the benefits of priority of U.S. application Ser. No. 15/958,335, entitled "Enhanced Vehicle Safety System," filed on Apr. 20, 2018 now abandonment, and which are incorporated herein by reference in their entirety.

FIELD OF INVENTION

The present invention relates generally to vehicle safety features, and more specifically to enabling forward facing brake light indicators with minimal impact on the interior aesthetics of a drivers vehicle.

BACKGROUND

Recent years have seen the incorporation of a variety of automated safety features incorporated into vehicles. Nearly all of these safety features are focused on the safety and protection of the vehicle's passengers. While airbags, proximity sensors, and cameras are now commonplace, currently existing technology is easy to dismiss and has not been revisited to see what improvements might be made. Namely warning lights system development has been stagnant and deserve a revisit given the new developments in the technology and the new ways many people are now using their automobiles, communication of a driver's intentions to those around them seems to be still completely forgotten or ignored by vehicle manufactures.

While it has become conventional and even mandatory for vehicles to be sold with preinstalled tail-lights which indicate to those behind the vehicle the intentions of the driver, the information as to the whether or not the brake is engaged is not information that is communicated to those in front of the vehicle.

Any driver can attest that despite the teachings of driving school, navigating amongst pedestrians in a parking lot or determining who was first to an unsignaled intersection has led to many near collisions. Worse still, is this lack of communication has undoubtedly resulted in actual collision and unfortunately injury and death.

Defensive driving and predicting another party's intentions, while valuable to any driver, can still be augmented and enhanced with additional information.

It is clear that it is both valuable and necessary for a driver to be able to indicate those in front of his or her vehicle that the brake is engaged, and that the vehicle is at a complete stop. Enabling such a system would eliminate many accidents and the uncertainty that pedestrians face in parking lots and cross walks.

That said, todays driver is already bombarded with all sorts of information, such that it is desirable to incorporate new safety features with minimal impact on the console, such that by introducing a new safety feature, the device isn't then contributing in another way to distract the driver defeating the goal of safety.

Additionally, with many of todays drivers becoming increasingly dependent on GPS navigation, many manufacturers have begun to incorporate these GPS systems into vehicles. That said, many people cannot afford these premium features and instead elect to use their smart phones. Many manufacturers elect to develop their own navigation and/or operating system, which often does not function as well as these cell phone navigation services, such that many people do not use these manufacture installed options. As such, it is increasingly a problem with drivers attempting to use their phones and nav systems while their vehicle is in motion.

This problem of driver distraction and "cabin clutter" has been exasperated with the advent and explosion of ride services like Uber and Lyft which require drivers to not only have access and use of their smart phone to pick up riders, but also require the driver to put all manners of non-standardized signage on the dash and/or window to display to customers that they are a part of the ride-sharing service.

Many of these drivers work for multiple services to maximize their own income potential such that it is not uncommon to see a driver with multiple placards, light up signage, stickers, or otherwise on their dash, windshield, and the like.

Further, many car owners are very particular of the interior aesthetic of their vehicle and minimal impact design is becoming more desired these days.

As such, it is desirable to consolidate this communication to drivers, passengers, fares awaiting pickup into a single system that can indicate information while being low impact on the interior aesthetic of the cabin.

It is contemplated that in some embodiments such a system could even factor in the precision of the proximity, distance, location, and CPU information that a vehicle is calculating in real-time, and in the event of driver failure, self-activate and attempt to warn those in the vicinity of the vehicle.

In other embodiments, it is considered that such an invention could accommodate additional desirable features such as vehicle location, battery backup, smart device docking and charging, or the inclusion of a screen that is visible to passengers that communicates more specific ride-share type functions that will be discussed below.

Such a system is now no longer out of reach of economic feasibility to create and implement in new vehicles, and as an aftermarket addition to vehicles that are already in service. Further, the state of the current technology would allow for such a system to be installed potentially with minimal intrusion. With wireless connectivity now common, inexpensive, and increasingly dependable, a user of the contemplated invention would be able to install it with minimal effort. Further, such a system could become a hub of sorts, whereby a user might be able to configure and customize the features of the system wirelessly.

OBJECTIVE OF THE INVENTION

It is an object of this invention to provide a forward facing brake light which is directed by a master brake control system such that it can be easily communicated to those in the front of a vehicle that the brakes are engaged.

It is an additional object of this invention to enable a master brake control system such that in addition to the driver's manual input, gps, cpu, Bluetooth, and proximity, distance, and other similar sensors may provide valuable input such that the front facing brake lights may be activated when context dictates it is appropriate to do so.

It is an additional object of this invention to consolidate the multi types of ride-share signage currently seen in the market to a standardized location that is unobtrusive for the driver and allows for valuable and pertinent information to be communicated to fares waiting pickup and riders.

It is an additional object of this invention to make it wireless and easy to install such that unexperienced consumers will feel comfortable installing the device as mass adoption means safer roads for all. Further, wireless installation would allow for vehicles currently in service to be retrofitted with the invention with ease and speed.

It is further an object to provide a brake light indicator assembly which may be externally powered independent of the vehicles power supply but may operate as an auxiliary battery if so connected and enabled.

It is further an object to provide a brake light indicator assembly which conforms to current materials and manufacturing thresholds that the automobile industry self imposes and that the United States DOT demands.

It is further an object of this invention to provide for information to be communicated through it such that a driver can leave their smart phones on their person or docked and instead reference the invention for directions and other like information.

SUMMARY OF THE INVENTION

A system to enhance vehicle safety is disclosed comprising a vehicle having a front end and a rear end; at least one visual signal light apparatus positioned in the proximity to the front end of the vehicle; the visual signal light apparatus illuminates when the vehicle's is decelerating via its braking system; wherein the visual light apparatus is comprised of a rear view mirror having a first surface facing the front of the vehicle and a second surface facing the rear of the vehicle wherein at least one portion of solar panel is embodied to the first surface and at least one or more LED lights is embodied to the first surface.

In another aspect of the invention, a system to enhance vehicle safety; comprising a vehicle having a front end and a rear end; at least one visual signal light apparatus positioned in the proximity to the front end of the vehicle; the visual signal light apparatus illuminates when the vehicle's is decelerating via its braking system; wherein the visual light apparatus is comprised of a first body portion wherein the first body portion is comprised of a convex body having a first surface facing the front of the vehicle and a second surface facing the rear of the vehicle a third surface facing the top of the vehicle and a firth surface facing the bottom of the vehicle wherein at least one or more LED lights is embodied to the first surface and at least one or more solar panels is embodied to the third surface; wherein the visual light apparatus is comprised of a second body portion wherein the second body portion is comprised of a mount suitable to mount the first body portion to a dashboard of the vehicle.

In yet another aspect of the invention, a system to enhance vehicle safety, comprising a vehicle having a front end and a rear end; at least one visual signal light apparatus positioned in the proximity to the front end of the vehicle; a traffic sign having a transmitter and transmits continuous electrical signals; the visual signal light apparatus having a receiver; the visual signal light apparatus illuminates when the vehicle approaches the traffic sign and the visual signal light apparatus having a receiver receives the continuous electrical signals. In one embodiment of the invention, the visual signal light is comprised of a power source and a wireless connection module wherein the visual signal light is controlled by the vehicle via the wireless connection module one embodiment of the invention, the vehicle is comprised of a central processing unit capable of controlling vehicle functions. In one embodiment of the invention, the visual signal light is comprised of a power source and a wireless connection module wherein the visual signal light is controlled by a smartphone via the wireless connection module.

In yet another aspect of the invention, a system to enhance vehicle safety, comprising a vehicle having a front end and a rear end; at least one visual signal light apparatus positioned in proximity to the front end of the vehicle; wherein the visual signal light apparatus illuminates when the vehicle is decelerating via a braking system; wherein the visual light apparatus is comprised of at least a main component and a mount component; wherein the mount component is suitable to mount the main component to a surface of the front end of the vehicle; wherein the main component is comprised of a housing extending in a transverse direction, an LED array, and a solar array; wherein the housing is comprised of a recessed portion; wherein the LED array is housed within the recessed portion of the housing; wherein the LED array faces the front end of the vehicle; and wherein the solar array is embodied to a top surface of the housing. In one embodiment, the visual signal light apparatus is comprised of a power source and a wireless connection module wherein the visual signal light apparatus is controlled by the vehicle via the wireless connection module. In another embodiment, the vehicle is comprised of a central processing unit capable of controlling vehicle functions. In another embodiment, the visual signal light apparatus is comprised of a power source and a wireless connection module wherein the visual signal light apparatus is controlled by a smartphone via the wireless connection module. In another embodiment, a digital display is embodied to the housing of the main component and the digital display faces the rear end of the vehicle.

In yet another aspect of the invention, a system to enhance vehicle safety, comprising a visual signal light apparatus positioned in proximity to a dashboard of a vehicle; wherein the visual signal light apparatus illuminates when the vehicle is decelerating via a braking system; wherein the visual light apparatus is comprised of at least a main component and a mount component; wherein the mount component is suitable to mount the main component to the dashboard of the vehicle via an adhesive; wherein the main component is comprised of a housing, a plurality of LED lights, a plurality of solar cells, and a digital display; wherein the housing comprises a recessed portion; wherein the plurality of LED lights are housed within the recessed portion of the housing and face a front end of the vehicle; wherein the plurality of solar cells are embodied to a top surface of the housing; Wherein a digital display is embodied to the housing and faces the rear end of the vehicle; and wherein a wire means is electrically connected to the braking system for providing electrical communication between the visual signal light apparatus and the braking system.

In yet another aspect of the invention, a system to enhance vehicle safety, comprising a vehicle having a front end and a rear end; at least one visual signal light apparatus positioned in proximity to the front end of the vehicle; wherein the visual signal light apparatus illuminates when the vehicle is decelerating via a braking system; wherein the visual light apparatus is comprised of a main component; wherein the main component is comprised of a recessed housing extending in a transverse direction to terminate at a lateral edge, wherein the recessed housing is comprised of a rear surface facing the rear end of the vehicle, a top surface facing a top of the vehicle, a bottom surface facing a bottom of the vehicle, and a surrounding wall surrounding a peripheral of the recessed housing; wherein the main component is further comprised of a front surface facing the front end of the vehicle and extending in a transverse direction to terminate at a lateral edge; wherein the front surface is comprised of a plurality of LED light guides; wherein the front surface is connected to the recessed housing; wherein the front surface and the rear surface of the main component are parallel; wherein a plurality of LED lights are housed within the recessed housing between the rear surface and the front surface; wherein a plurality of solar cells are embodied to the top surface of the main component; and wherein a digital display is embodied to the rear surface of the main component; wherein the visual light apparatus is further comprised of a mount component suitable to mount the main component to a dashboard of the vehicle via an adhesive. In one aspect of the invention, a forward facing brake indicator light apparatus is disclosed comprising a main component, a mount component and a controller component wherein the main component is comprised of a recessed housing extending in a transverse direction to terminate at a lateral edge, wherein the recessed housing is comprised of a rear surface facing the rear end of the vehicle, a top surface facing a top of the vehicle, a bottom surface facing a bottom of the vehicle, and a surrounding wall surrounding a peripheral of the recessed housing; wherein the main component is further comprised of a front surface facing the front end of the vehicle and extending in a transverse direction to terminate at a lateral edge; wherein the front surface is comprised of a plurality of LED light guides; wherein the front surface is connected to the recessed housing; wherein the front surface and the rear surface of the main component are parallel; wherein a plurality of LED lights embedded on a CPB board are housed within the recessed housing between the rear surface and the front surface; wherein a main cpu is embedded on the CPB board that controls the illumination of the led lights; wherein a plurality of metal plates are secured to the recessed housing wherein the controller component is comprised of a top housing and a bottom housing wherein a CPB board and a battery is housed between the top housing and the bottom housing wherein the CPB board is comprised of a controller cpu and a connector wherein the connector is capable of connecting to any vehicle tail brake lights and the controller cpu is linked to the main cpu via wireless technology wherein the controller cpu sends signal to the main cpu to activate the LED lights when the vehicle tail brake light is activated; wherein the mount component is comprised of a plurality of magnets wherein the main component is mounted and secured to the mount component by a the metal plates are attracted to the magnets by magnetic force.

BRIEF DESCRIPTION

The present invention will be understood and appreciated more fully from the following detailed description taken in conjunction with the drawings in which.

Figure 1:
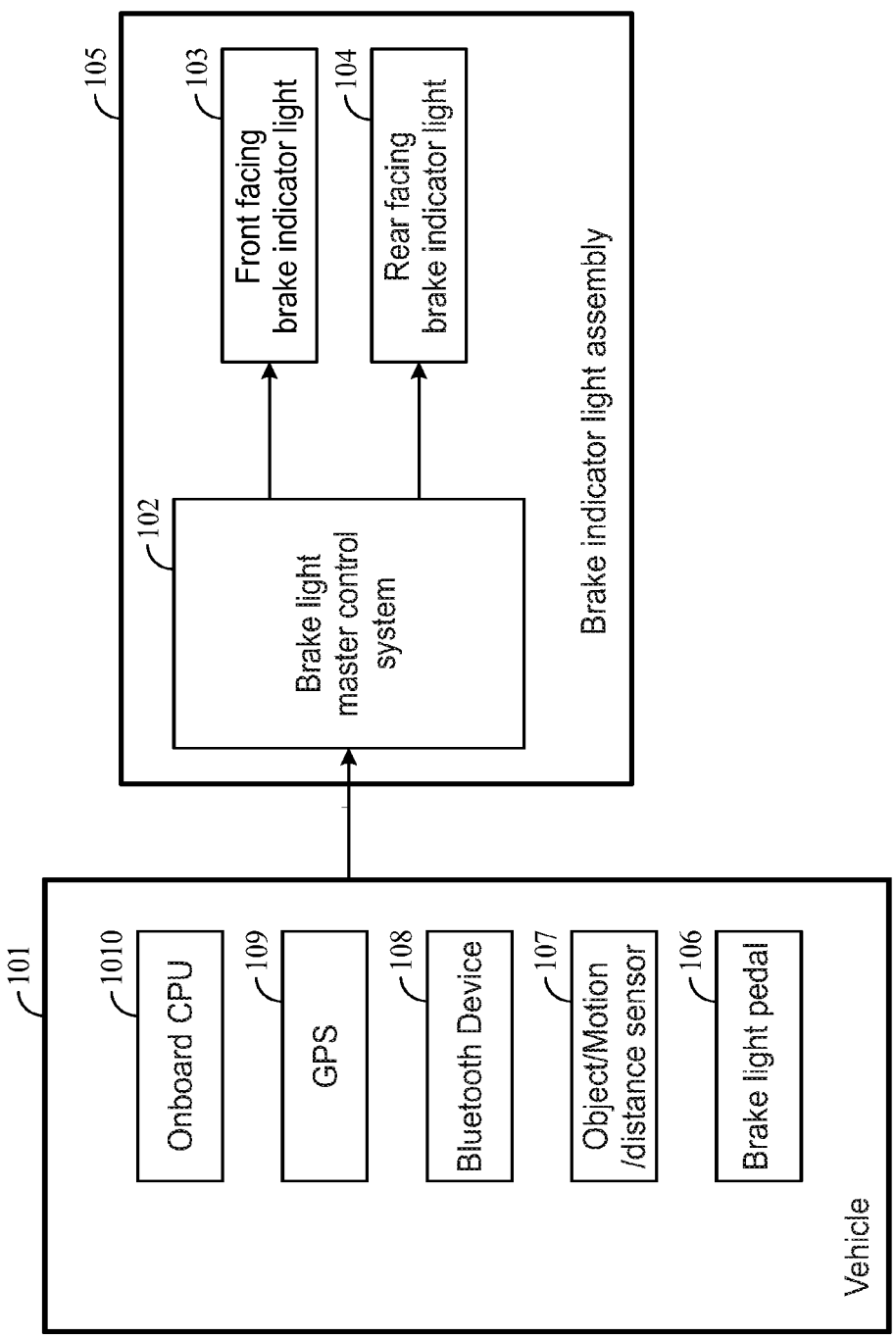
FIG. 1 is a system diagram illustrating the present invention wherein the diagram discloses the apparatus of the present invention comprising a brake light master control system and a front facing brake indicator light.
Figure 7:
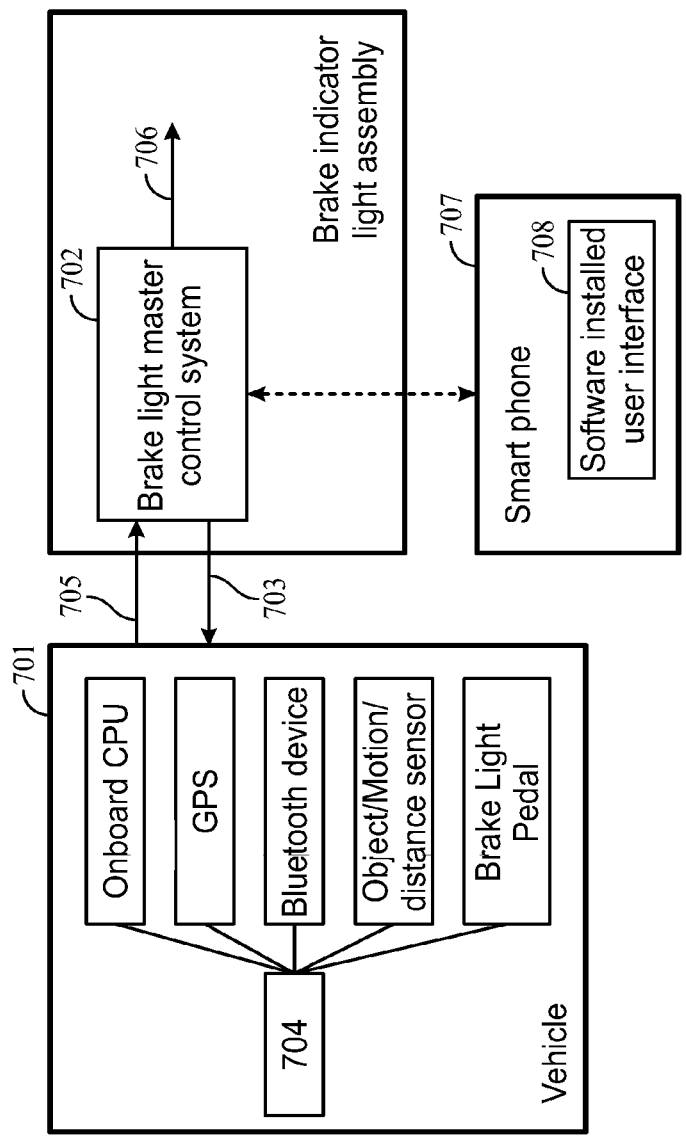

FIG. 7 is a system diagram of FIG. 1. where the brake indicator light assembly further includes the addition of external smart phone connectivity whereby by way of a software interface on the user's smart phone, a user may interact directly with the brake light master control system and control the respective settings for the described system. In turn, the brake light master control system, in a preferred embodiment would also be able to interact with the onboard car GPS as well as the other electronic sensors and systems to allow further tuning and customization.

FIG. 8 is a pictorial illustration of contemplated positioning of the front facing brake indicator light or lights in accordance with an embodiment of the present invention as seen from the exterior of the vehicle.

FIG. 9 is a pictorial illustration of an embodiment of the present invention that indicates the relative location of the invention on the dashboard and describes additional contemplated functionality whereby the invention is built into the dashboard by the manufacturer is able to raise and lower.

Figure 10:
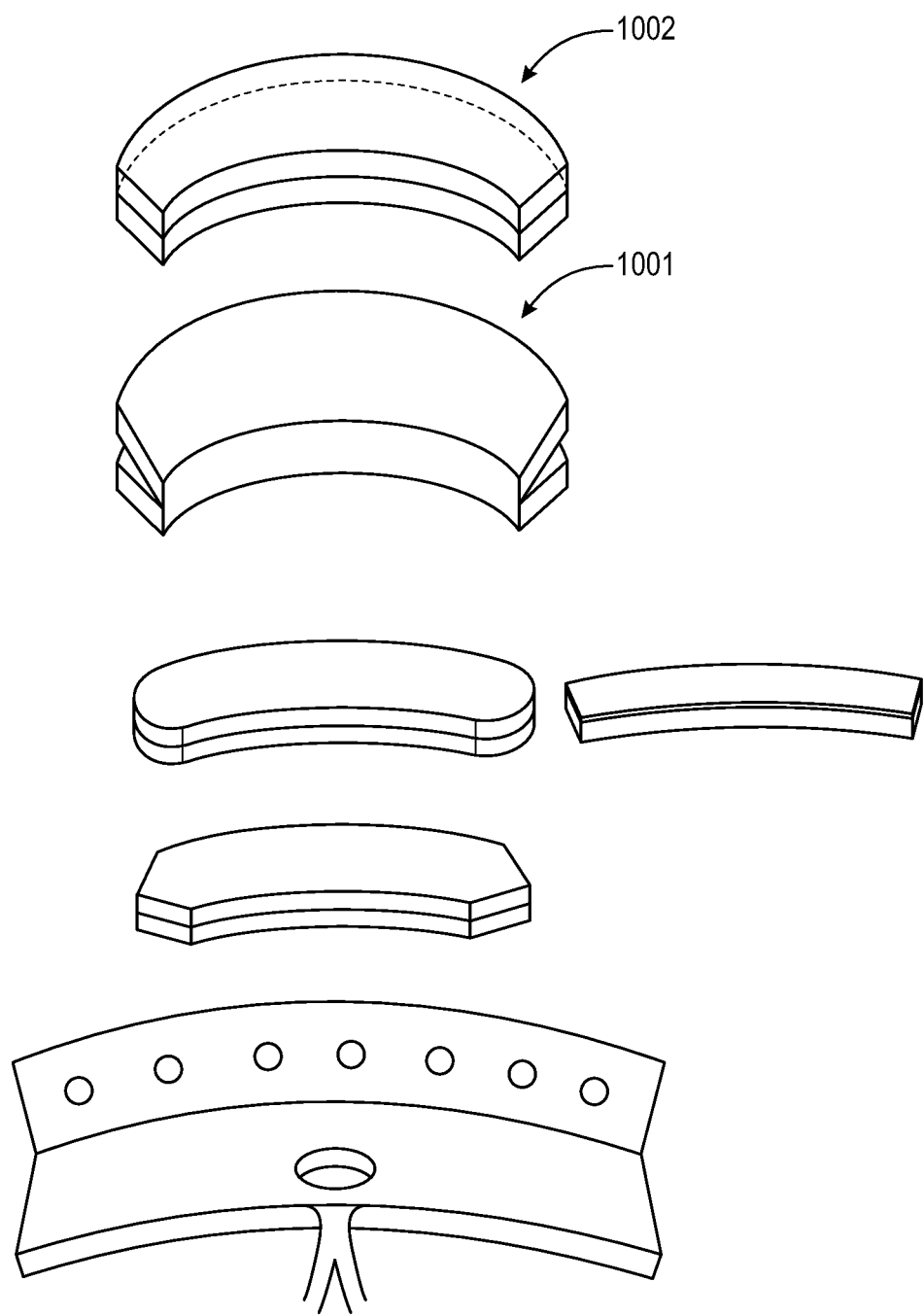

FIG. 10 is a pictorial illustration of an embodiment of the present invention that indicates the relative location of the invention on the dashboard and describes additional contemplated functionality whereby the invention is built into the dashboard by the manufacturer is able to flip open and shut.

Figure 11:
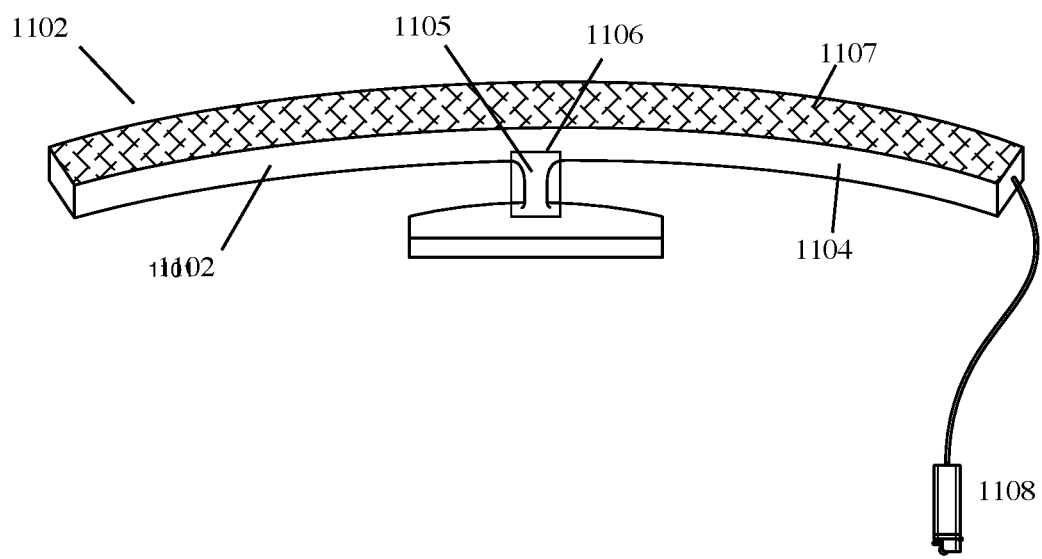

FIG. 11 is a pictorial illustration of an embodiment of the present invention whereby the invention is after-market installation and is mounted on the top of the dash. This version, in its most un-intrusive installation, is not wired directly into the vehicles electrical system and instead is powered via traditional auxiliary power sources, in this case, the ac/cigar lighter power source.

Figure 12:
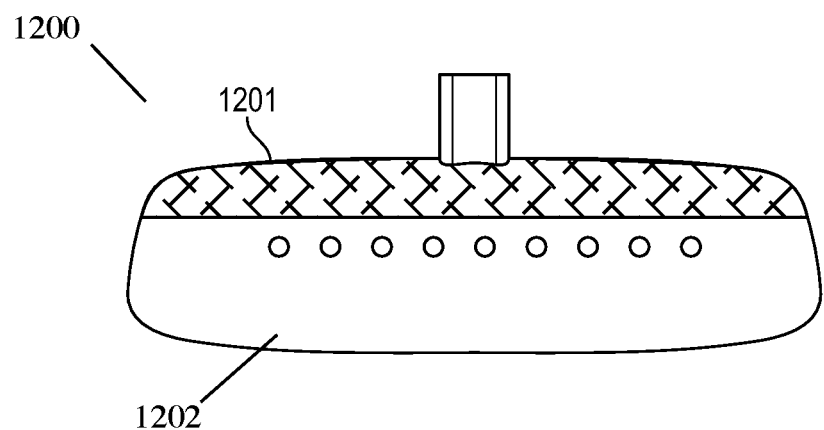

FIG. 12 is a pictorial illustration of an embodiment of the present invention whereby the invention is installed on and a part of the vehicles rear-view mirror and the visual signal lights are factory installed and embedded into the molding of the rear-view mirror which is facing the front windshield.

Figure 13:
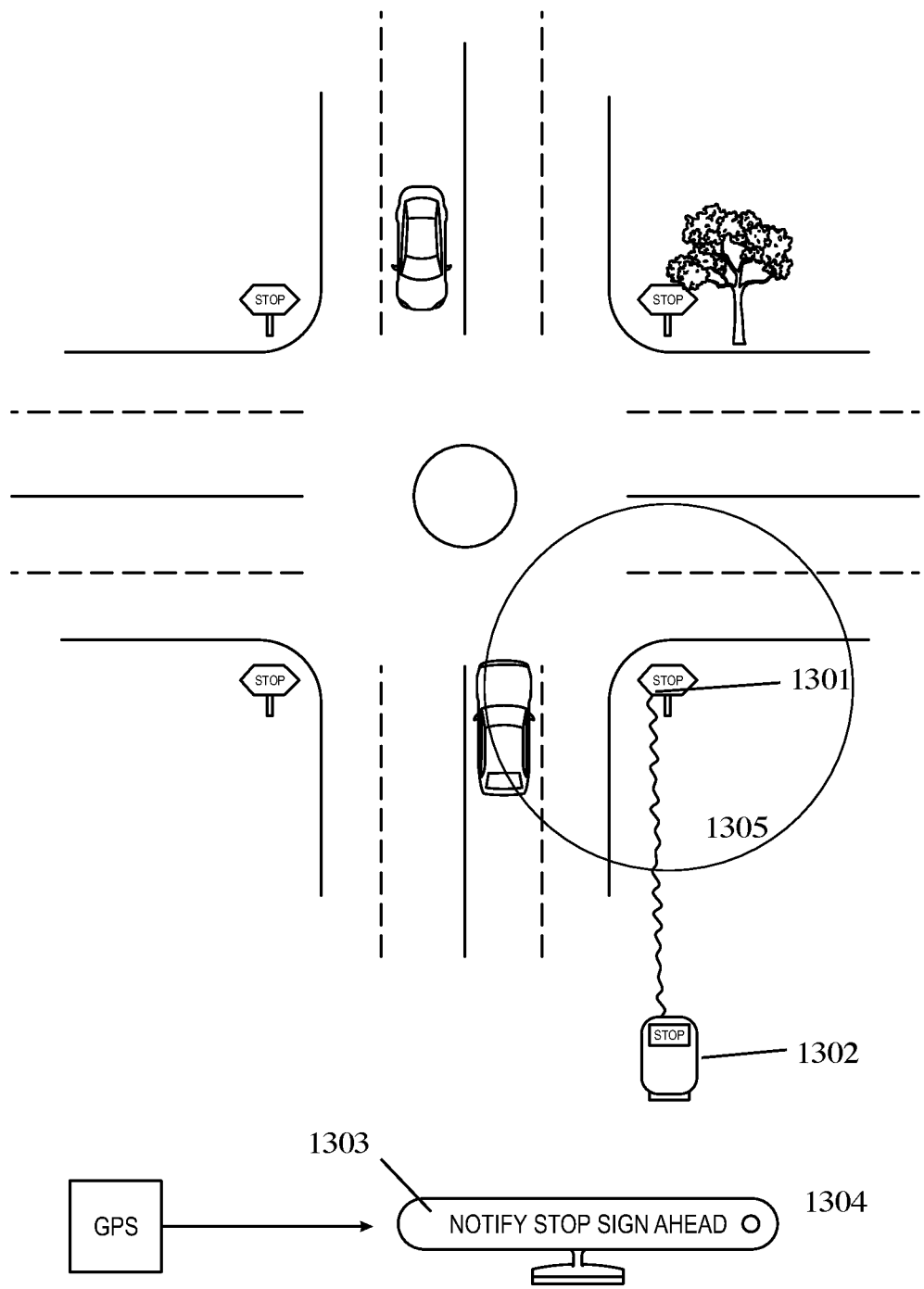

FIG. 13 is a pictorial illustration of an embodiment of the present invention which enables detection of traffic signs that may be obstructed, hidden, or non-obvious and warning instructions are then communicated to the driver.

Figure 14:
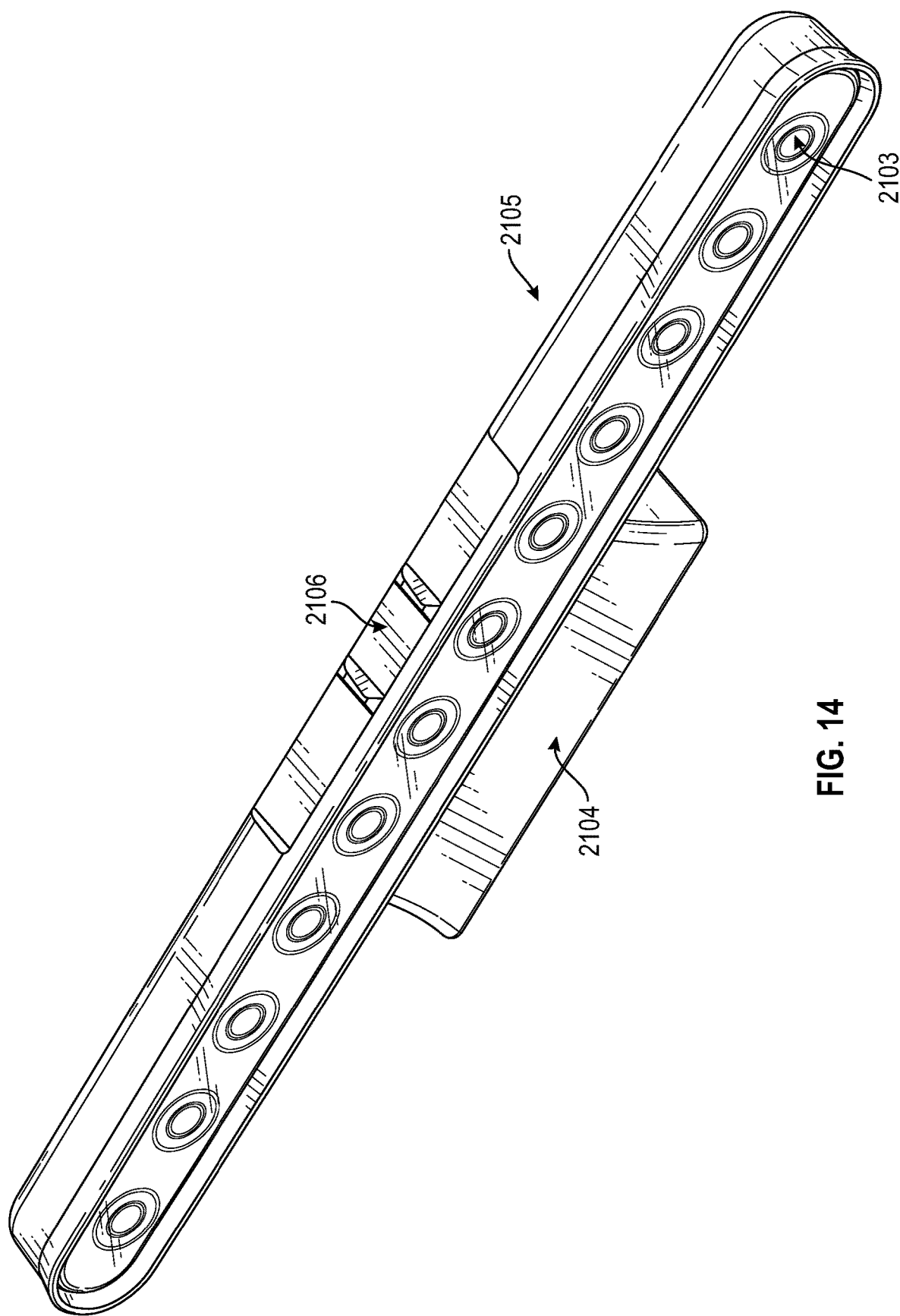

FIG. 14 is a pictorial illustration of the present invention disclosing a front perspective view of a visual signal light apparatus comprising a front facing brake indicator light assembly and mount.

FIG. 15 is a pictorial illustration of the present invention disclosing a front view of a visual signal light apparatus comprising a front facing brake indicator light assembly and mount.

FIG. 16 is a pictorial illustration of the present invention disclosing a rear view of a visual signal light apparatus and mount.

Figure 17:
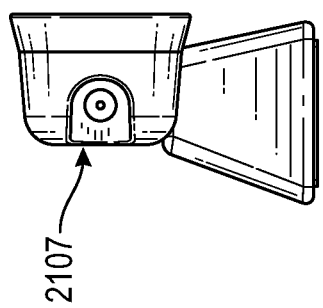

FIG. 17 is a pictorial illustration of an embodiment of the present invention disclosing a right side view of a visual signal light apparatus comprising an auxiliary cable.

Figure 18:
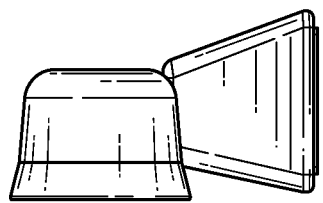

FIG. 18 is a pictorial illustration of the present invention disclosing a left side view of a visual signal light apparatus.

FIG. 19 is a pictorial illustration of the present invention disclosing a top plan view of a visual signal light apparatus comprising a solar array.

FIG. 20 is a pictorial illustration of the present invention disclosing a bottom plan view of a visual signal light apparatus.

Figure 21:
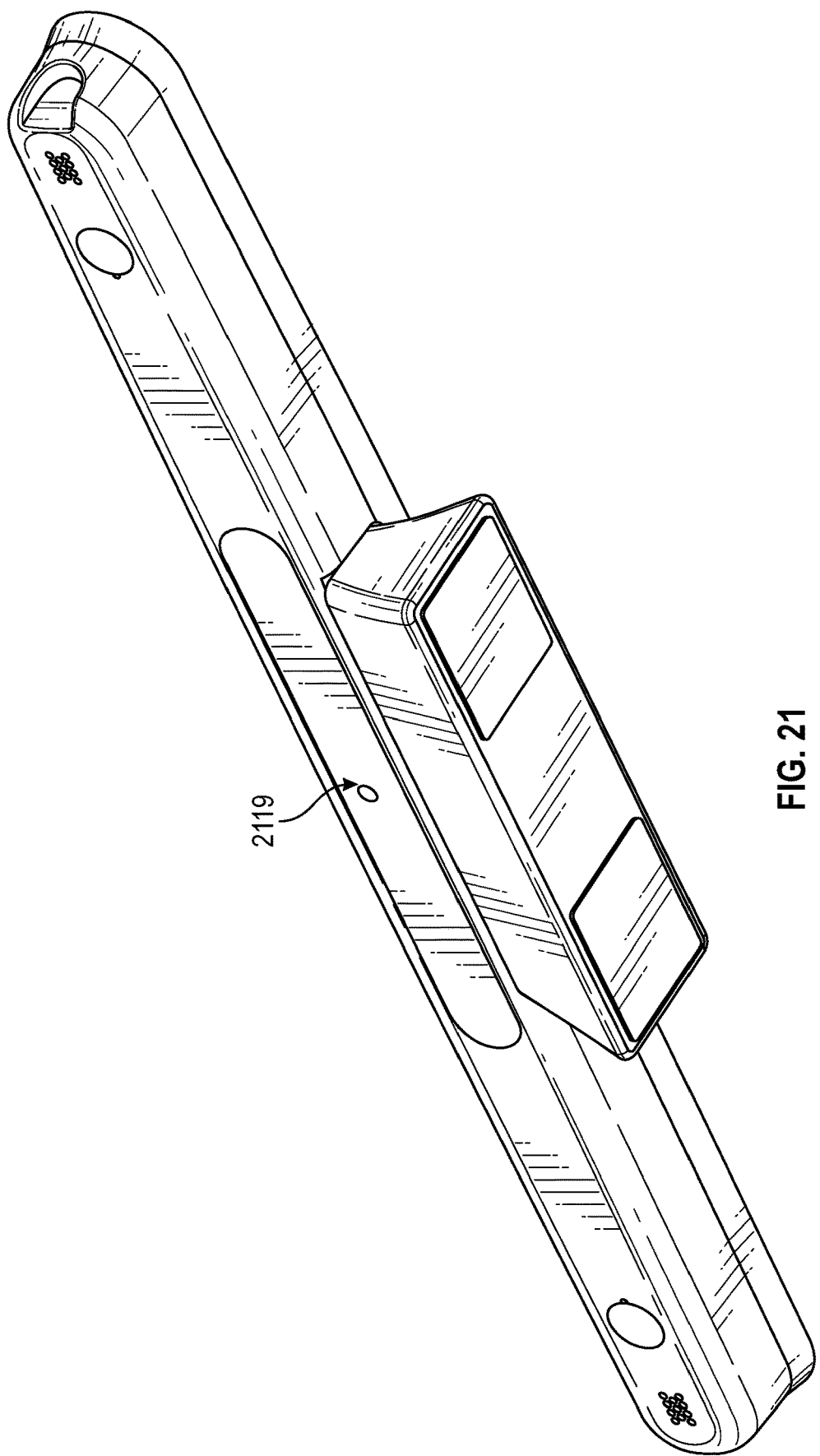

FIG. 21 is a pictorial illustration of the present invention disclosing a rear perspective view of a visual signal light apparatus and mount.

Figure 22:
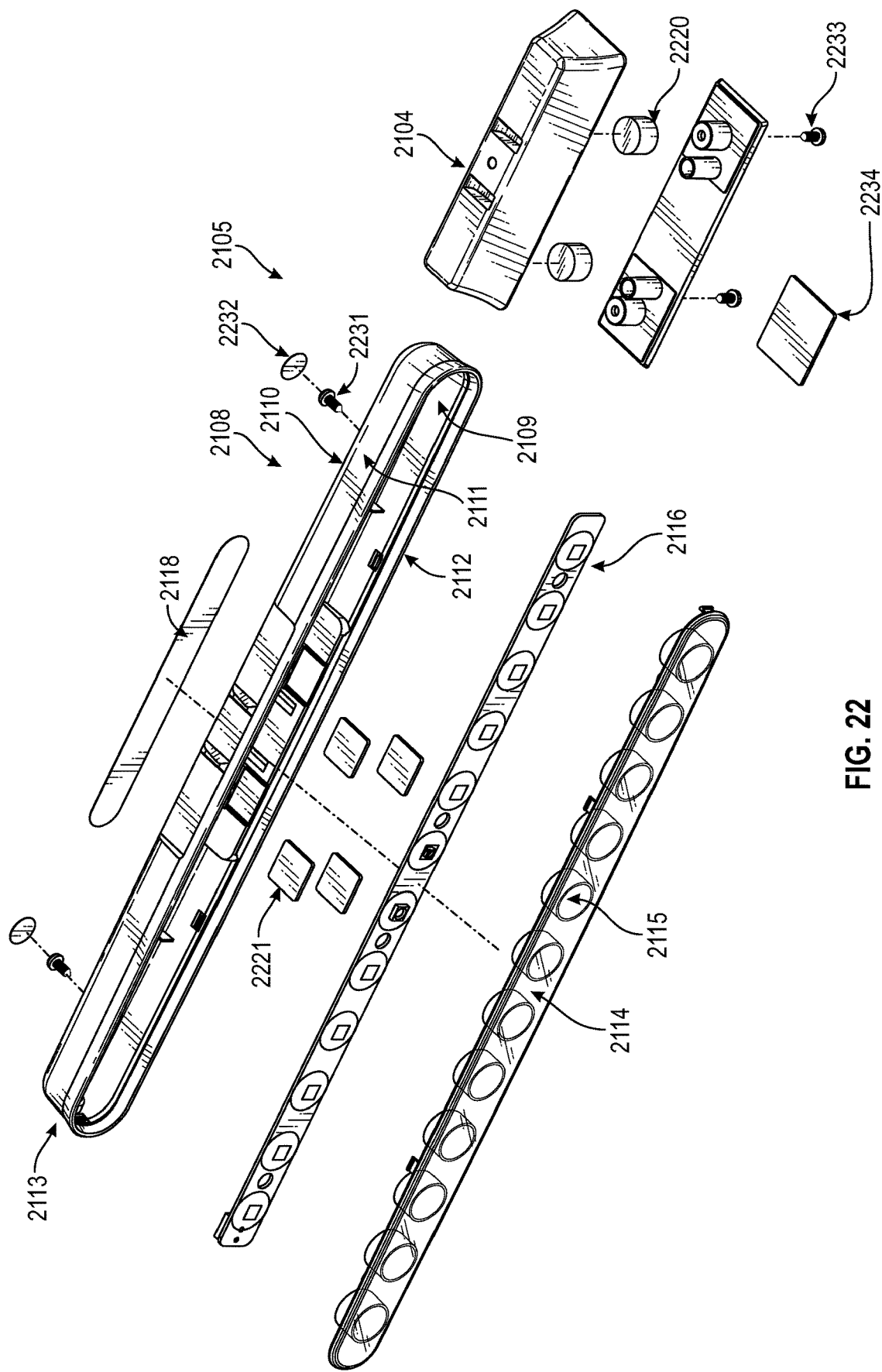

FIG. 22 is a pictorial illustration of the present invention disclosing an exploded view of a visual signal light apparatus comprising a front facing brake indicator light assembly and mount.

Figure 23:
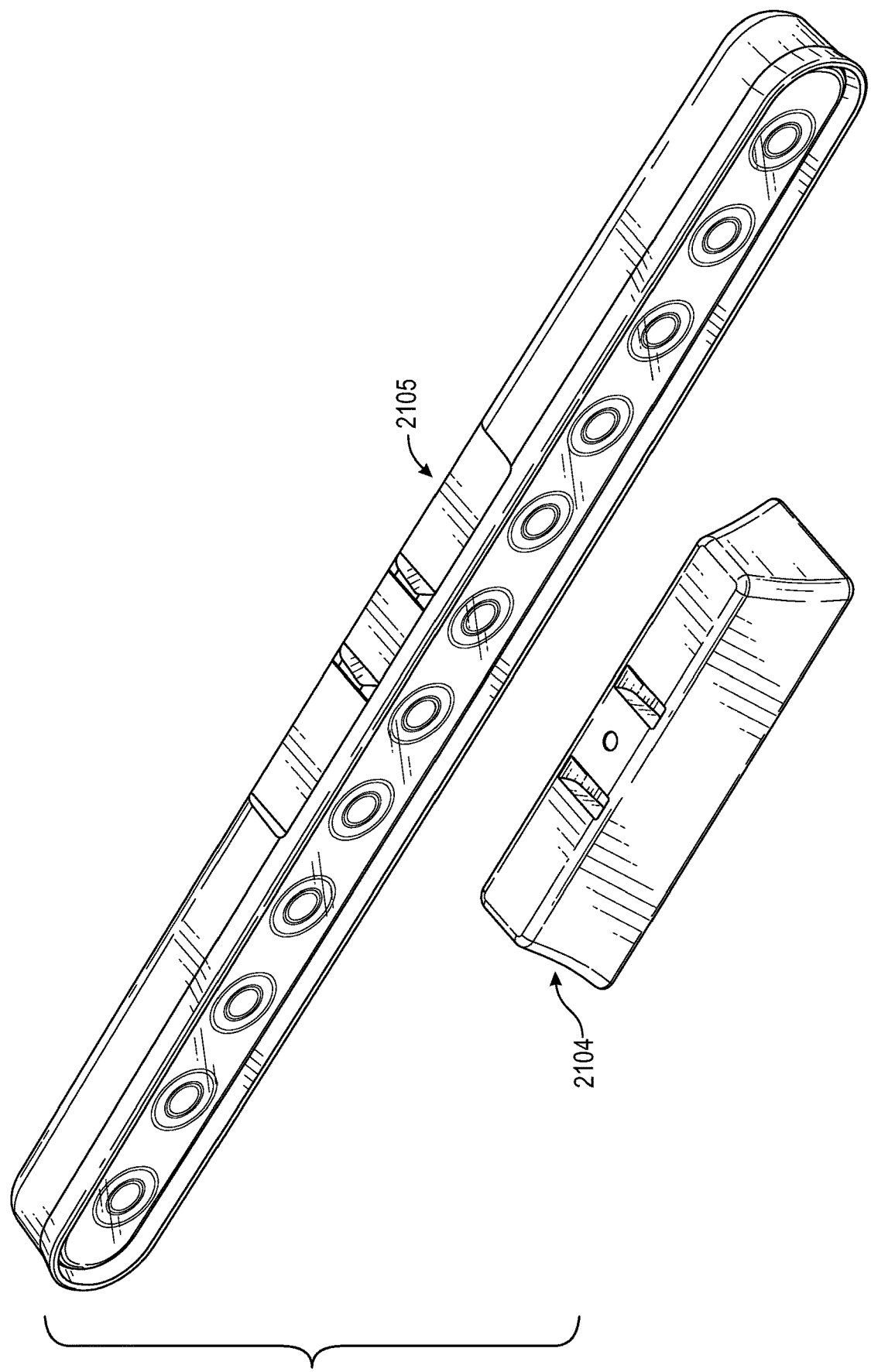

FIG. 23 is a pictorial illustration of the present invention disclosing another embodiment of the present invention.

Figure 24:
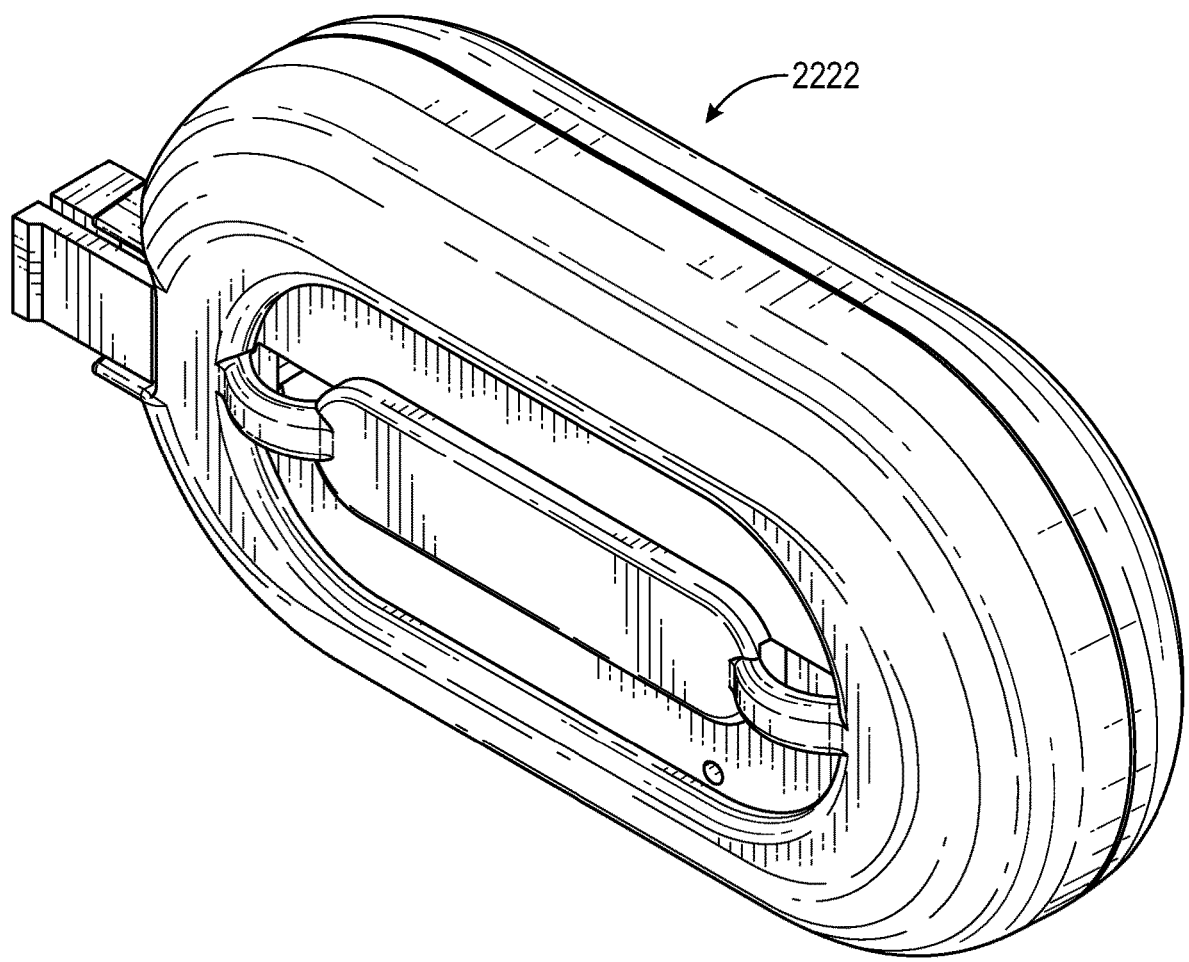

FIG. 24 is a pictorial illustration of the present invention disclosing an embodiment of the controller.

Figure 25:
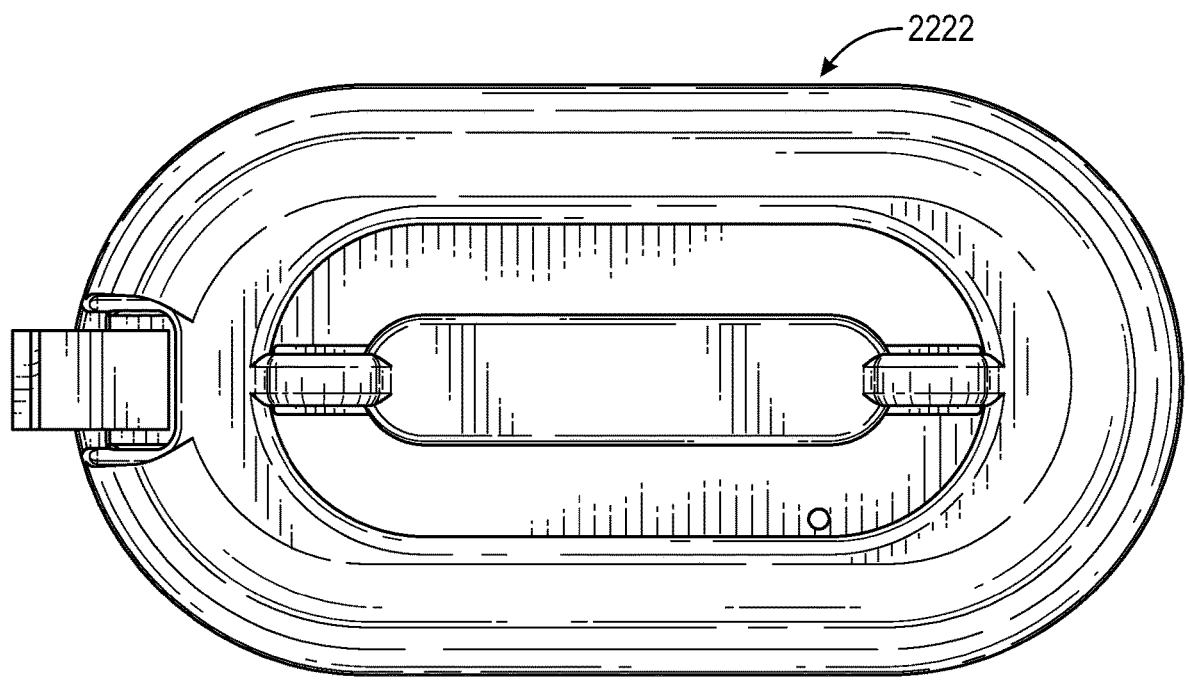

FIG. 25 is a pictorial illustration of the present invention disclosing top view of the controller.

Figure 26:
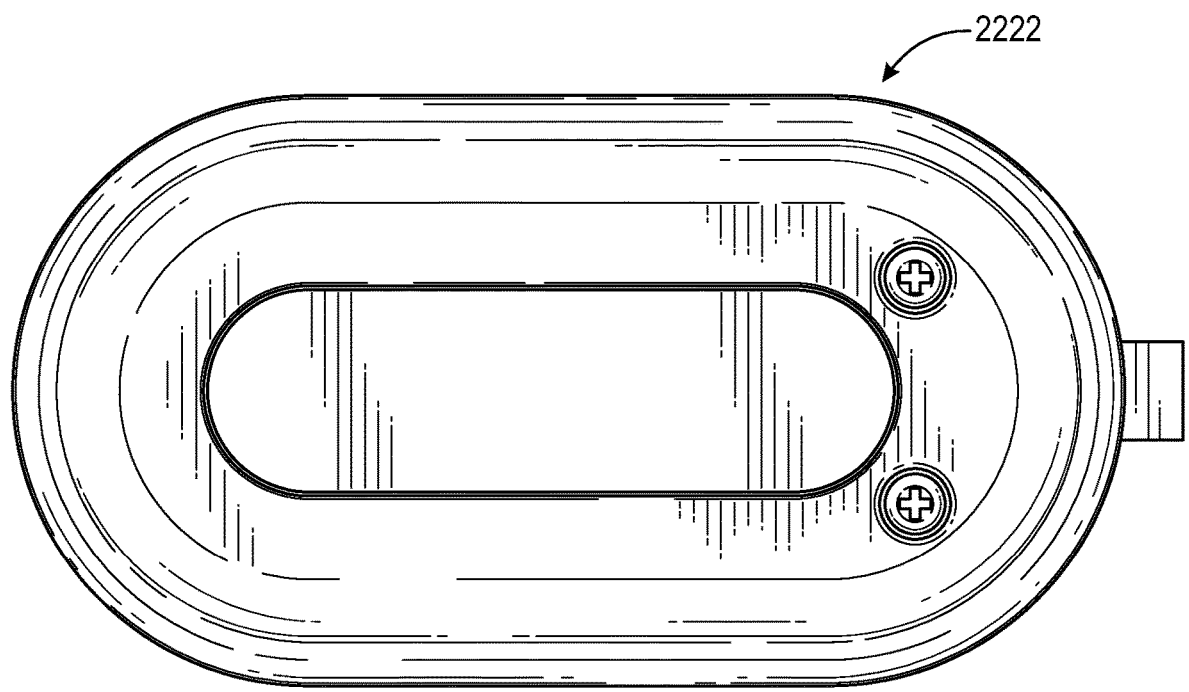

FIG. 26 is a pictorial illustration of the present invention disclosing bottom view of the controller.

Figure 27:
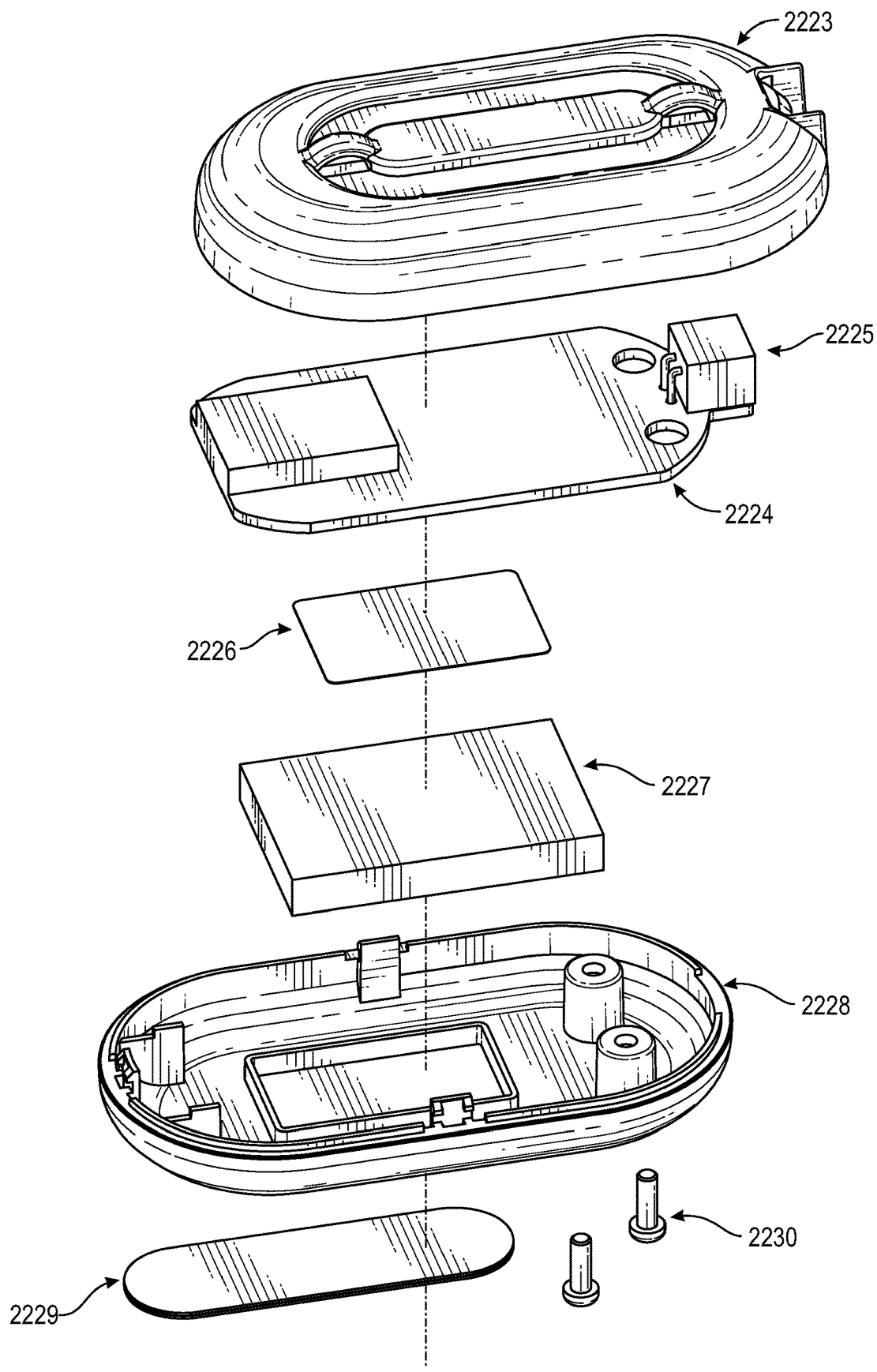

FIG. 27 is a pictorial illustration of the present invention disclosing an exploded view of a controller for the front facing brake indicator.

DETAILED DESCRIPTION

Reference is now made to FIG. 1, which illustrates an apparatus comprising a brake indicator light assembly 105, constructed and operative in accordance with an embodiment of the present invention.

In FIG. 1, the diagram discloses a typical embodiment on the present invention. The apparatus comprises a braking indicator light assembly 105 which includes at least a front facing brake indicator light 103 which is coupled to a brake light master control system 102 which is connected to the vehicles electrical system and mechanically connected to the vehicle 101. Disclosed also is a brake light master control system 102 which responsible for powering and turning on and off both the front face brake indicator light 103 and the rear facing brake indicator light 104. Also disclosed in the diagram is a brake light pedal 106, which when depressed, sends a signal to the brake light master control 102 which responds by powering and turning on and off both the front facing brake indicator light 103 and the rear facing indicator light 104 according to the rules governing the brake light master control system's 102 output to each of these respective lights.

The brake light master control system 102 itself receives input from the brake light pedal 106, but it is also contemplated that input may be received directly from the vehicle cpu 1010, vehicle attached GPS 109, Bluetooth paired GPS 108, object recognition sensors 107, motion sensors 107, or collision detection systems 107 such that if it is anticipated that the vehicle may be coming to a stop, the brake light master control system 102 interacts with and activates the front facing brake indicator light 103 and rear facing brake indicator light 104 regardless of any input from the brake light pedal 106.

In an exemplary embodiment of the invention, both the brake light master control 102 and the front facing brake indicator light 103 are accommodated for and incorporated into the vehicle's design and original assembly. However, it should be understood that it is contemplated that the brake light master control 102 and front facing brake indicator light 103 may, in the alternate, be wired into and attached to the vehicle after factory assembly has occurred. In one embodiment this is accomplished by way of the brake light master control 102 being wired in series in the factory connection that would electrically connect the brake light pedal 106 with the rear facing brake indicator light. In yet another embodiment, the brake indicator light assembly 105 is attached to the vehicle 101 without a modification to the factory assembled wiring and operates as a system without sending output to the vehicle's rear facing brake indicator light 104. In a post-factory embodiment, the front facing brake indicator light 103 itself would necessitate mechanical attachment to fixed front facing position of the vehicle.

In an exemplary embodiment of the invention, the brake light master control 102 sends identical signals to both the front and rear facing brake indicator lights 103 104 as to whether or not to light or not. However, it is contemplated that it may be desirable for the front facing brake indicator light 103 to blink, flash, or send other visual cues or warnings. As such, the brake light master control 102 may also receive input from the brake pedal 106 and other sources and sensors mentioned above and instead operate the front facing brake indicator light 103 and the rear facing brake indicator light 104 such that the state of each light does not necessarily match each other at all times.

Figure 2:
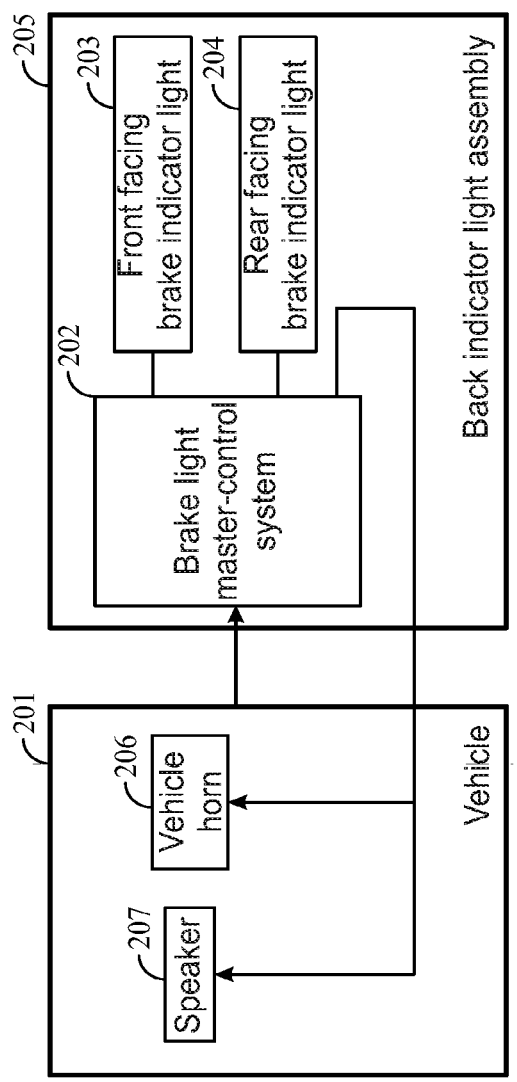
FIG. 2 is a pictorial illustration of currently existing ride-share signage along with mounted smart-phones, meant to illustrate "cabin clutter".
Figure 3:
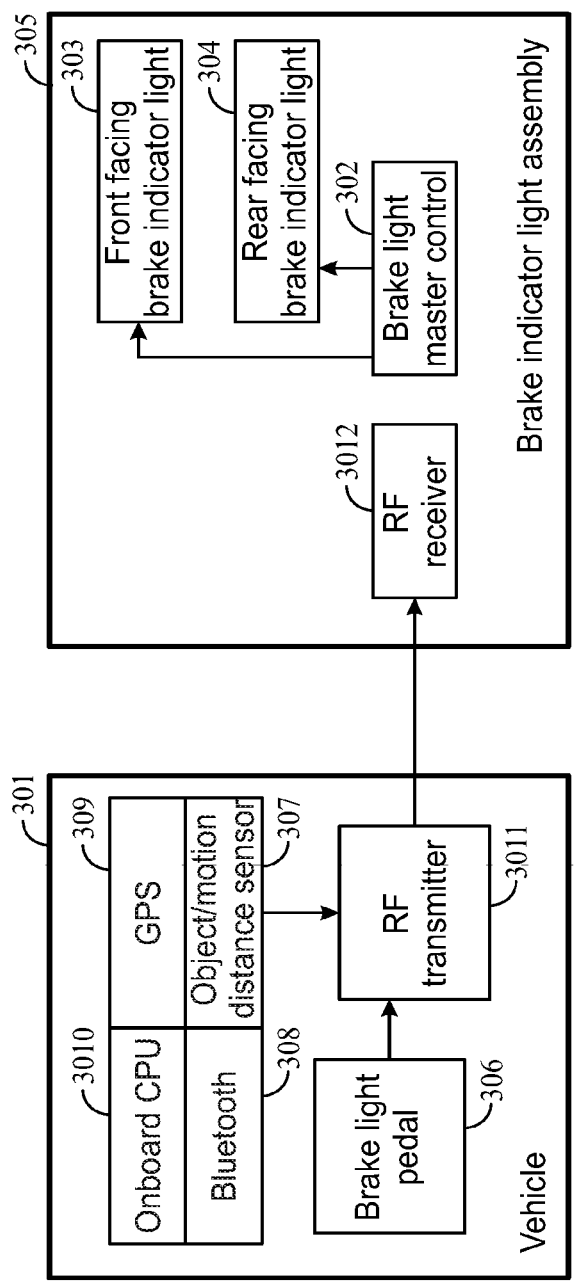
FIG. 3 is a system diagram of FIG. 1. where the brake indicator light assembly further includes the addition of a RC receiver and the addition of a RF transmitter to enable wireless installation and functionality.

Now referring to FIG. 2, Now referring to FIG. 3, the diagram discloses essentially the same system as disclosed in FIG. 1. installed onto a vehicle 301 except that in lieu of the brake light pedal 306 communicating to the brake light master control system 302 by way of a direct electrical connection, communication is now accomplished by way of the addition of a RF transmitter 3011 and a RF receiver 3012. The brake light master control system 302 would continue to function as described above and control the output to the front and rear facing brake indicator lights 303 304. Braking input would be received by the RF transmitter 3011 by way of the brake light pedal 306, vehicle cpu 3010, vehicle attached GPS 309, Bluetooth paired GPS 308, object recognition sensors 307, motion sensors 307, or collision detection systems 307 and then relayed to the RF receiver 3012, which would interact directly with the brake light master control system 302.

While the exemplary embodiment of the invention prefers a design whereby the brake light indicator assembly 305 is directly incorporated into the design and factory installed, it must be considered that it is still desirable to accommodate a quick, simple and un-intrusive installation of the brake light indicator assembly 305.

It must be considered that factory installed safety improvements do nothing to improve the safety of the drivers who do not plan on purchasing a new vehicle in the near future.

As such, it is desirable to enable the invention to be retro-fitted to vehicles that are already manufactured and on the road in a manner such that a consumer may purchase the device and self-install with as little difficulty as possible. Because the electrical systems of vehicles are likely to be the most obvious bottleneck for the installation of an electrically powered aftermarket device, the easiest way to simplify the aftermarket device is to eliminate features of the device that could be directly wired and instead substitute wireless interactivity. A comparable analogy would be aftermarket car alarms, many of which began to simplify the amount of wiring and installation required in order to appeal to consumers that were unwilling or financially unable to pursue professional installation services.

Further, it must also be considered that classic or antique cars electrical systems may be unable to accommodate the present invention such that the contemplated wireless connectivity must be utilized.

Figure 4:
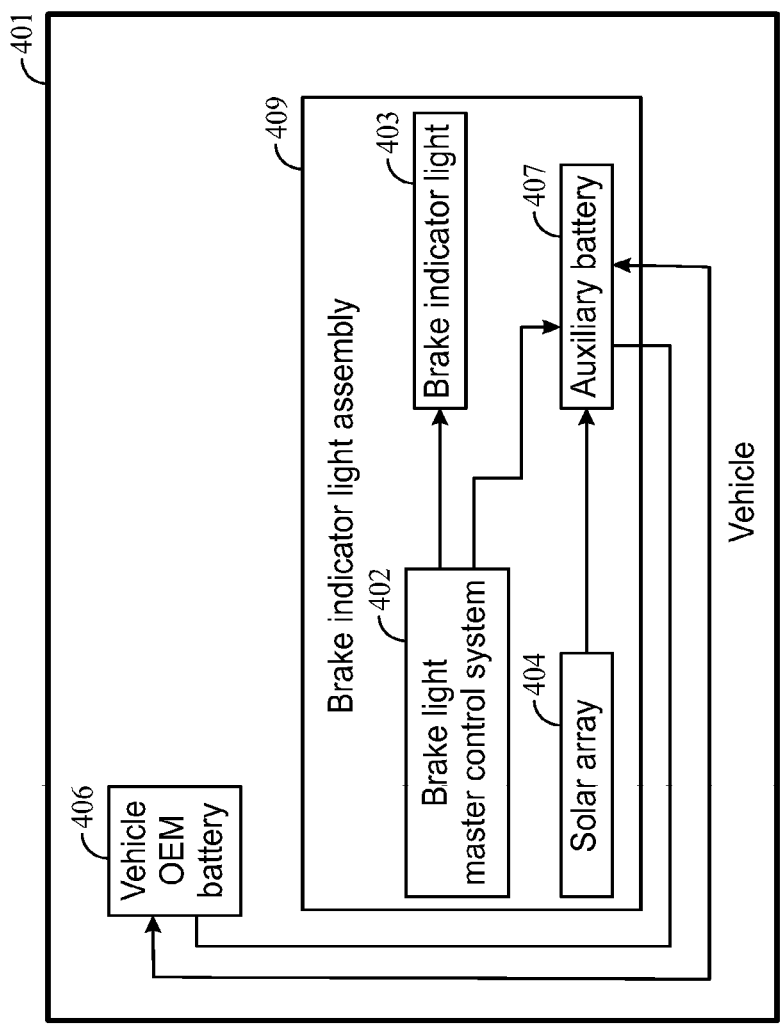
FIG. 4 is a system diagram of FIG. 1. where the brake indicator light assembly further includes the addition of a solar array and an auxiliary battery that may function either independently or in serial with the vehicle's factory installed battery.

Now referring to FIG. 4, the diagram discloses essentially the same system as disclosed in FIG. 1. except that the brake indicator light assembly 405, which includes both the brake light master control system 402 and brake indicator light(s) 403 would additionally now includes a power supply in the form of an auxiliary battery 407 which is separate and distinct from the vehicle's factory installed battery 406, as well as a solar array 404 to facilitate charging this separate battery.

As was similarly contemplated in the discussion of FIG. 3 above, the elimination of professional installation or invasive installation is desirable.

As such, it may be preferable to have the disclosed invention be powered by a battery that is independent of the vehicle's factory installed battery.

This configuration would allow for the invention, in combination with the RF technology disclosed above, to be reduced to distinct physical components that would merely require mechanical attachment by the aftermarket consumer.

However, it may also be desirable to instead wire this auxiliary battery 407 and solar array 404, such that the installation of the brake indicator light assembly 405 to any vehicle would enable a source of emergency power, such that the vehicle could either start from the auxiliary battery 407 in the event of the vehicles main battery 406 failure. Should the output of this auxiliary battery 407 be insufficient to jump start an automobile, it may still operate such that in emergency conditions it would be able to charge small electronics.

This additional functionality would further incentivize vehicle manufacturers and aftermarket adoption.

Figure 5:
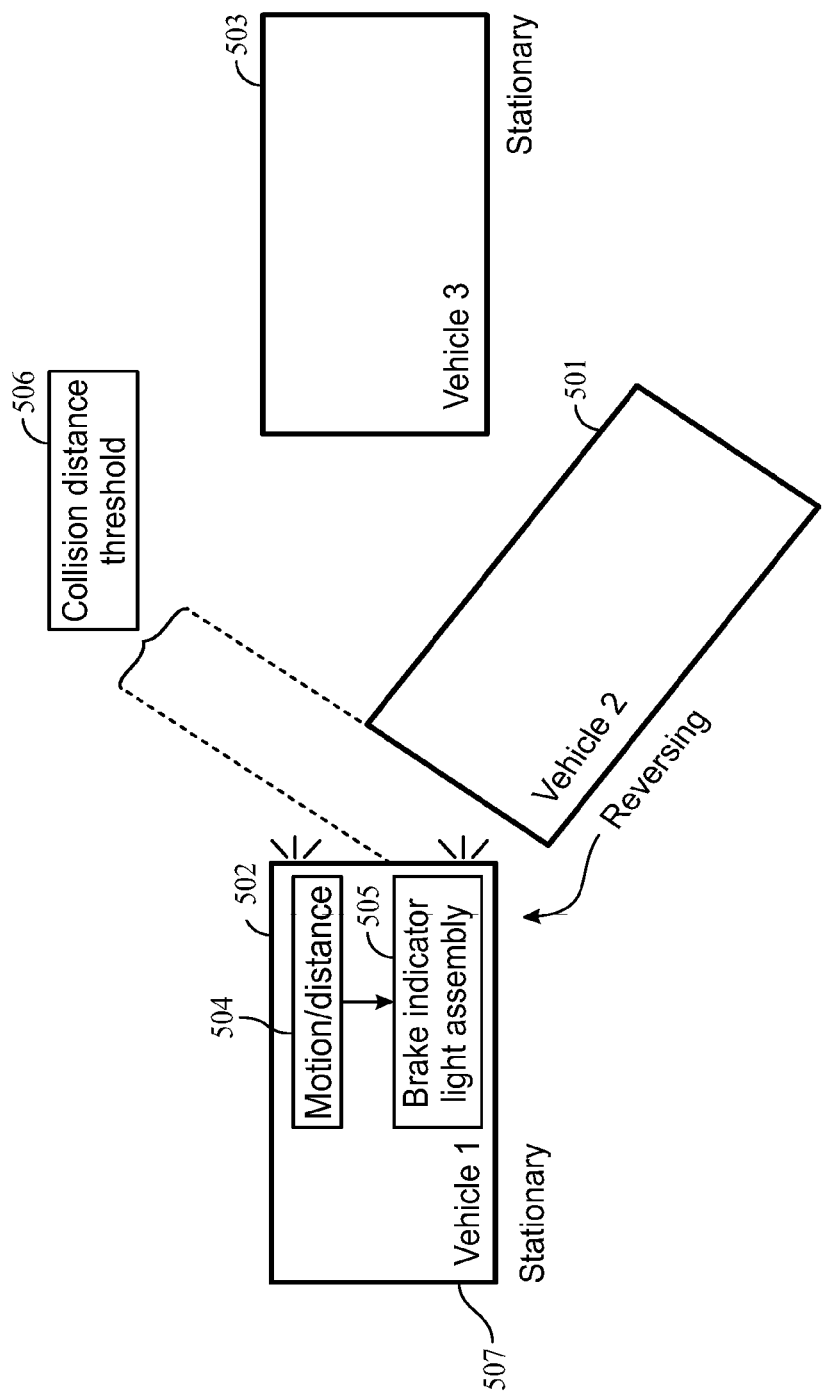
FIG. 5 and FIG. 6 are pictorial illustrations of the present invention enabling additional parking assistance functionality.

Now referring to FIG. 5, the illustration discloses additional functionality of the invention. In particular, it is desirable for motorists who are attempting difficult parking maneuvers to receive warnings in order to avoid collision.

While it is now becoming more commonplace for vehicles to come installed with cameras and/or proximity detectors that sound to facilitate parking, in another embodiment of the invention it is disclosed a method for indicating to drivers a visual indicator that collision is imminent.

In FIG. 5, a parking vehicle 501 is contemplated wherein the driver is attempting to reverse into a parking spot and parallel park between two vehicles 503 507. The disclosed invention is installed 502 on parked vehicle 507. As parking vehicle 501 begins to reverse into the parking spot, parked vehicle 502's motion and/or distance sensors 504 become active. Once parking vehicle 501 is within sufficient distance such that it has crosses a collision distance threshold 506, the motion and/or distance sensors 504 interact with the brake indicator light assembly 505 such that the brake light master control activates the front facing brake indicator light, alerting the parking vehicle 501 that it is too close and needs to stop.

Figure 6:
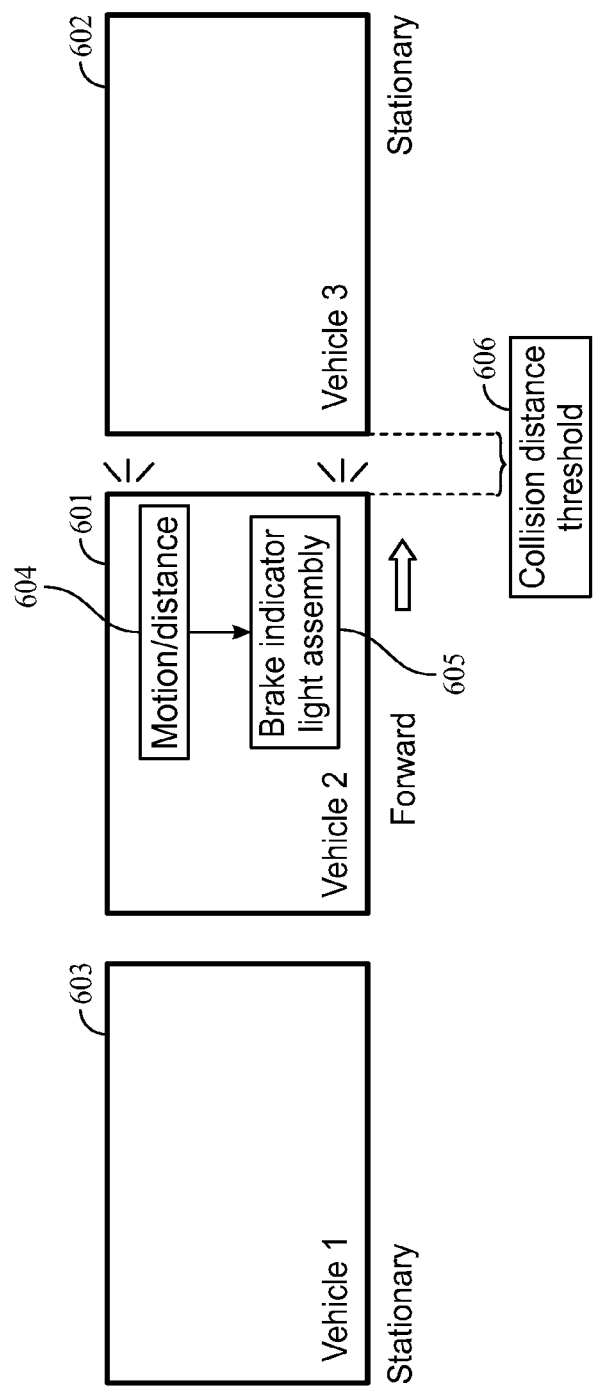

Similarly in FIG. 6, the parking vehicle 601 is now outfitted with the disclosed invention 605 and attempting parking between vehicles 603 602. As in FIG. 5, the same system would indicate to the driver that their vehicle is now dangerously close to colliding with the car directly to the vehicle's front, parked vehicle 602, once the motion and/or distance sensors 604 detected the collision distance threshold 606 had been crossed and collision was imminent.

Now referring to FIG. 7, the diagram discloses essentially the same system as disclosed in FIG. 1. except that the brake indicator light assembly attached to a vehicle 701, which includes the brake light master control system 702 would now additionally include the capability to communicate wirelessly with a user's smartphone 707 by way of a software installed user interface 708 on said phone.

In such an embodiment, it is contemplated, and has been discussed above, that it is likely preferable to minimize the amount of aftermarket wiring that the installation of such a system might require. Further, as has been contemplated and discussed above, the brake light master control system is likely to be receiving input 705 from a multitude of sources, including but not limited to a brake light pedal, the vehicle's onboard gps, a gps system, Bluetooth enabled devices, and a variety of object, motion and distance sensors 704. As such, it is preferable to instead consider the brake light master control system 702 the central hub for all of these received signals and configure the responses of the system directly with the brake light master control system instead of each of these different input sources 704 individually.

It is further considered that the optimal installation point of the brake light master control system 702 may be in a corner of the engine compartment, the trunk, under a seat, or in another location such that the vehicles overall aesthetic is left unchanged. As such, instead of communicating these setting by way of direct physical interaction the brake light master control system 702, instead the user only needs to tune and modify the settings of the system by way of their smart phone 702 and the software 708 installed thereupon.

A user would by way of such an interface would be able to not only tune the output 706 that the brake light master control system would send to the vehicle's braking light but in another contemplated embodiment, use this interface to make configurations upstream 703 to the various input sources 704 as well. Such an embodiment would be preferable as it is both practical and desirable for a user to have access to one interface that controls and configures a multitude of systems as opposed to interacting with each system and device separately when tuning and customizing for their particular purposes.

Finally, FIG. 8, illustrates a multitude of contemplated positions for the front facing brake indicator light.

In an exemplary embodiment, the front facing light comprises a unit that is located on the inside of the vehicle, on the top of the dashboard, in the middle of the of the vehicle 801 on top of the dash board and 802 where the lamp is in the middle of the windshield outside of the windshield. In yet another embodiment, the lamps are placed on either side or both sides of the pillar of the windshield. As described above, one aim of the invention is to have a minimal impact on the aesthetic of the vehicle, while incorporating a multitude of features as will be described below into a discreet installation. This of course is balanced against the current headlight and turn-lamp configuration on vehicles, such that it is desirable to locate the light in a location that is easily seen by pedestrians, and one that is unlikely to be confused with other lights.

That said, it may still be desirable to allow for multiple configurations as studies may show that pedestrians are particularly receptive to one configuration over another. Further, vehicle manufacturers may also want to maintain or present a particular aesthetic style with their line of vehicles.

As contemplated, additional lights might be incorporated into and around the vehicles front grill and emblem 80, 806. In an effort to further distinguish the brake light from the current traditionally placed lights on a vehicle, it is contemplated that the light(s) might be placed along the entire bottom of the windshield 807. In the alternative, and in keeping with the theme of minimal impact, it is similarly considered that the unit, instead of being a part of the dash, might instead be incorporated into the rear-view mirror 808. In the embodiment 808 displayed, the lamps are incorporated to the rear view mirror specifically on the rear side for on-going traffic to see.

In an exemplary embodiment, the light utilized LED or similar technology such that the front facing brake indicator light is bright enough to be recognized for purposes of both traffic standards and readability and recognition of pedestrians and other non-motorized vehicle traffic. Further, LED or similar technology has been shown to be a durable light source that can last for more light hours than standard filament based light bulbs. Further, LED or similar technology would allow auto manufactures the most convenience and freedom into incorporating into auto body styles as LED or similar technology requires less physical area to occupy. However, it should be understood that traditional vehicle light bulb technology is contemplated, and in the alternative, employed as a substitute.

FIG. 9 is a pictorial illustration of an embodiment of the present invention that indicates the relative location of the invention on the dashboard and describes additional contemplated functionality whereby the invention 902 is built into the dashboard 901 by the manufacturer is able to raise and lower into a recessed portion 903 of the dashboard such that when the car is turned off, the front facing brake light unit 905 will lower into the dash console and be flush with the rest of the dash console. This pictorial illustration also indicates the described solar functionality, such that the solar cells 904 are to be located along the top of the front facing light unit such that in either a raised/on or lowered/off position, the solar cells are still visible and available to receive sunlight and charge the secondary battery 906 which is run in series such that it may provide an emergency auxiliary power source to start the vehicle or be used to power consumer electronics or vehicle functions such as the radio, without drawing from the primary vehicle battery while the vehicle is not on and running.

We next consider a focused view on the front of the front facing light unit itself 906. Here it is considered that the unit might only have the functionality to communicate general warnings or signals by way of a simple light array 908. However, it is considered that it may be desirable to instead use a higher density led array or screen, such that a multitude of colors, messages, or logos may be displayed 907.

This screen display embodiment 907 would be particularly useful in communicating to potential ride-share fares that the vehicle is aligned with a particular company. Further, because the screen is dynamic and updateable, potentially this outward, fare facing signage might serve to indicate that the vehicle is the rider's particular pick-up by way of displaying a name, or something unique that the rider could identify. This particular embodiment becomes increasingly relevant as ride-share programs have now been dealing with the repercussions of unlicensed or unauthorized vehicles masquerading as being part of a particular ride share program, sometimes with tragic consequence to these vulnerable riders. On a more basic level, it would at the very least prevent altercations between multiple riders who have summons pick-up from a particular location as it would be easy to communicate which vehicle is meant for which rider.

Similarly, this same display functionality could be incorporated into an additional screen placed on the driver facing portion of the unit. The information displayed to the driver could be step by step navigation directions. Returning to the notion of serving function to ride-share programs, because the unit is centrally located, it is viewable to a passenger as well. The information that would be relevant to display to this passenger could be information such as welcome signage, ride-share and/or driver identification information, advertising, or other visually communicated information.

FIG. 10 is a pictorial illustration of an embodiment of the present invention that indicates the relative location of the invention on the dashboard and describes additional contemplated functionality whereby the invention is built into the dashboard by the manufacturer is able to flip open 1001 instead of raising out of the console with the activation and closes shut, similar to a clam-shell design 1002, with the shut-down of the vehicle.

FIG. 11 is a pictorial illustration of an embodiment of the present invention whereby the invention is after-market installation and is mounted on the top of the dashboard either by the purchaser or by professional installation. This version, in its most un-intrusive installation, is not wired directly into the vehicles electrical system and instead is powered via traditional auxiliary power sources, in this embodiment, the ac/cigar lighter power source 1108.

FIG. 11 also communicates the various orthographic of views, such that it is clear which surfaces of the device face what direction relative to the vehicle. Again, in this aftermarket embodiment version of the device, the same basic functions are considered, such as the solar element 1107 and charging functionality, the necessary outward facing lights 1102. On this particular embodiment, the driver facing surface, 1101, is a flat surface, but in more expensive models, the same functionality of additional lights/screens on this surface could be implemented. As a simple flat surface 1101 however, it is still contemplated that it would be desirable to provide either a surface for a mount, or the mount itself 1105, for a driver's cell phone 1106, such that it is centrally located, and out of the way of the drivers vision. Additionally, this flat surface allows for a surface for identification signage for passenger safety.

This unit also contemplates the inclusion of a GPS device 1104. The including of a GPS device would allow for the capability for the vehicle to more accurately broadcast the vehicle location. This serves many potential purposes. For the driver, it may be useful in locating the vehicle as to its location in a crowded and full parking lot. As to a rider, it may be useful in better locating the vehicle and driver for pickup. In one embodiment, the GPS records parking location coordinates and sends the information to a smart phone wherein the smartphone has an application that shows the user where the vehicle is parked.

FIG. 12 is a pictorial illustration of an embodiment 1200 of the present invention whereby the invention is installed on and a part of the vehicles rear-view mirror and the visual signal lights are factory installed and embedded into the molding of the rear-view mirror which is facing the front windshield.

In this particular embodiment, it is contemplated that nearly all of the previously described functionalities are present, with the exception of a driver or passenger facing screen, or phone mount, as the rear view mirror 1202 itself must be preserved on the driver facing surface 1201 of the device. However, this particular embodiment may still be desirable as it achieves perhaps the most minimal impact on the vehicles overall aesthetic.

FIG. 13 is a pictorial illustration of an embodiment of the present invention which illustrates an embodiment that contemplates the detection of traffic signs that may be obstructed, hidden, or non-obvious and warning instructions are then communicated to the driver on the driver facing LED surface of the front facing light unit.

As contemplated, stop signs and other fixed traffic signs could be easily fitted with a beacon 1301. The vehicle itself would be outfitted with a listening receiver 1302. When approaching signage, once the vehicle was within an appropriate triggering radius 1305, the receiver would detect and trigger, then displaying either a non-verbal flashing warning on the driver side facing LED surface 1303 of the front facing light unit 1304. In the alternate, it would be possible to indicate with greater specificity what sort of sign was being approached, and an approximate distance to the sign. In one embodiment, the radius is 1000 feet. In another embodiment, the radius is between 0-500 feet.

Reference is now made to FIG. 14, which illustrates an apparatus comprising a visual signal light apparatus 105, constructed and operative in accordance with an embodiment of the present invention.

Now referring to FIG. 14, a pictorial illustration of the invention disclosing a front perspective view of a visual signal light apparatus comprising a front facing brake indicator light assembly and mount. The visual signal light apparatus 2105 comprises at least a front facing brake indicator light assembly 2103 and mount 2104. The front facing brake indicator light assembly is coupled to a brake light master control system which is connected to a vehicles electrical system and mechanically connected to the vehicle. The brake light master control system is responsible for powering and turning on and off both the front facing brake indicator light assembly 2103 and the rear facing brake indicator light assembly. When a brake light pedal is depressed a signal is sent to the brake light master control system which responds by powering and turning on and off both the front facing brake indicator light assembly 2103 and the rear facing brake indicator light assembly according to the rules governing the brake light master control system's output to each of these respective lights.

The brake light master control system itself receives input from the brake light pedal, but it is also contemplated that input may be received directly from the vehicle cpu, vehicle attached GPS, Bluetooth paired GPS, object recognition sensors, motion sensors, or collision detection systems such that if it is anticipated that the vehicle may be coming to a stop, the brake light master control system interacts with and activates the front facing brake indicator light assembly 2103 and rear facing brake indicator light assembly regardless of any input from the brake light pedal.

In an exemplary embodiment of the invention, in lieu of the brake light pedal communicating to the brake light master control system by way of a direct electrical connection, communication is now accomplished by way of the addition of a RF transmitter and a RF receiver. The brake light master control system would continue to function as described above and control the output to the front and rear facing brake indicator light assemblies. Braking input would be received by the RF transmitter by way of the brake light pedal, vehicle cpu, vehicle attached GPS, Bluetooth paired GPS, object recognition sensors, motion sensors, or collision detection systems and then relayed to the RF receiver, which would interact directly with the brake light master control system.

In an exemplary embodiment of the invention, both the brake light master control system and the visual signal light apparatus 2105/front facing brake indicator light assembly 2103 are accommodated for and incorporated into the vehicle's design and original assembly. However, it should be understood that it is contemplated that the brake light master control system and visual signal light apparatus 2105/front facing brake indicator light assembly 2103 may, in the alternate, be wired into and attached to the vehicle after factory assembly has occurred. In one embodiment this is accomplished by way of the brake light master control system being wired in series in the factory connection that would electrically connect the brake light pedal with the rear facing brake indicator light assembly. In yet another embodiment, the visual signal light apparatus 2105/front facing brake indicator light assembly 2103 is attached to the vehicle without a modification to the factory assembled wiring and operates without sending output to the vehicle's rear facing brake indicator light assembly. In a post-factory embodiment, the visual signal light apparatus 2105 itself would necessitate mechanical attachment by any suitable means, such as a mount 2104, stand, or the like, to a fixed front facing position of the vehicle.

In an exemplary embodiment of the invention, the brake light master control system sends identical signals to both the front facing visual signal light apparatus 2103 and rear facing visual signal light apparatus as to whether or not to light or not. However, it is contemplated that it may be desirable for the front facing visual signal light apparatus 2103 to blink, flash, or send other visual cues or warnings. As such, the brake light master control system may also receive input from the brake pedal and other sources and sensors and instead operate the front facing brake indicator light assembly 2103 and the rear facing brake indicator light assembly such that the state of each light assembly does not necessarily match each other at all times.

In one embodiment, the visual signal light apparatus 2105 additionally comprises a power supply in the form of an auxiliary or secondary battery which is separate and distinct from the vehicle's factory installed battery, as well as a solar array 2106 (including one or more solar panels or solar cells) to facilitate charging this separate battery. As such, it may be preferable to have the disclosed invention be powered by a battery that is independent of the vehicle's factory installed battery.

However, it may also be desirable to instead wire (via an auxiliary cable input 2107) this auxiliary battery and solar array 2106, such that the installation of the visual signal light apparatus 2105 to any vehicle would enable a source of emergency power, such that the vehicle could start from the auxiliary battery in the event of the vehicles main battery failure. Should the output of this auxiliary battery be insufficient to jump start an automobile, it may still operate such that in emergency conditions it would be able to charge small electronics. This additional functionality would further incentivize vehicle manufacturers and aftermarket adoption.

This pictorial illustration also indicates the described solar functionality, such that one or more solar panels or solar cells of the solar array 2106 are to be located along the top surface of the visual signal light apparatus 2105 such that in either a raised/on or lowered/off position, the solar array is still visible and available to receive sunlight and charge the auxiliary battery which is run in series such that it may provide an emergency auxiliary power source to start the vehicle or be used to power consumer electronics or vehicle functions such as the radio, without drawing from the primary vehicle battery while the vehicle is not on and running.

While the exemplary embodiment of the invention prefers a design whereby the visual signal light apparatus 2105 is directly incorporated into the design and factory installed, it must be considered that it is still desirable to accommodate a quick, simple and un-intrusive installation of the visual signal light apparatus 2105.

It must be considered that factory installed safety improvements do nothing to improve the safety of the drivers who do not plan on purchasing a new vehicle in the near future. As such, it is desirable to enable the visual signal light apparatus 2105 to be retro-fitted to vehicles that are already manufactured and on the road in a manner such that a consumer may purchase the device and self-install with as little difficulty as possible. Because the electrical systems of vehicles are likely to be the most obvious bottleneck for the installation of an electrically powered aftermarket device, the easiest way to simplify the aftermarket device is to eliminate features of the device that could be directly wired and instead substitute wireless interactivity. A comparable analogy would be aftermarket car alarms, many of which began to simplify the amount of wiring and installation required in order to appeal to consumers that were unwilling or financially unable to pursue professional installation services.

Further, it must also be considered that classic or antique cars electrical systems may be unable to accommodate the present invention such that the contemplated wireless connectivity must be utilized.

Now referring to FIG. 15, a pictorial illustration of the present invention disclosing a front view of a visual signal light apparatus comprising a front facing brake indicator light assembly and mount. In an exemplary embodiment, the front facing brake indicator light assembly 2103 utilizes LED or similar technology such that the assembly 2103 is bright enough to be recognized for purposes of both traffic standards and readability and recognition of pedestrians and other non-motorized vehicle traffic. Further, LED or similar technology has been shown to be a durable light source that can last for more light hours than standard filament based light bulbs. Further, LED or similar technology would allow auto manufactures the most convenience and freedom into incorporating into auto body styles as LED or similar technology requires less physical area to occupy. However, it should be understood that traditional vehicle light bulb technology is contemplated, and in the alternative, employed as a substitute.

It is considered that the visual signal light apparatus 2105 might only have the functionality to communicate general warnings or signals by way of a simple light array. However, it is considered that it may be desirable to instead use a higher density LED array or screen, such that a multitude of colors, messages, or logos may be displayed. This screen display embodiment would be particularly useful in communicating to potential ride-share fares that the vehicle is aligned with a particular company. Further, because the screen is dynamic and updateable, potentially this outward, fare facing signage might serve to indicate that the vehicle is the rider's particular pick-up by way of displaying a name, or something unique that the rider could identify. This particular embodiment becomes increasingly relevant as ride-share programs have now been dealing with the repercussions of unlicensed or unauthorized vehicles masquerading as being part of a particular ride share program, sometimes with tragic consequence to these vulnerable riders. On a more basic level, it would at the very least prevent altercations between multiple riders who have summons pick-up from a particular location as it would be easy to communicate which vehicle is meant for which rider.

In an exemplary embodiment, the visual signal light apparatus 2105 comprises at least a front facing brake indicator light assembly 2103 that is located on the inside of the vehicle on the top of the dashboard. In yet another embodiment, the front facing brake indicator light assembly 2103 is placed on either side or both sides of the pillar of the windshield. In yet another embodiment, the front facing brake indicator light assembly 2103 is built into the dashboard by the manufacturer and is able to raise and lower into a recessed portion of the dashboard such that when the car is turned off, the front facing brake light assembly 2103 will lower into the dashboard console and be flush with the rest of the dashboard console.

As described above, one aim of the invention is to have a minimal impact on the aesthetic of the vehicle, while incorporating a multitude of features as will be described below into a discreet installation. This of course is balanced against the current headlight and turn-lamp configuration on vehicles, such that it is desirable to locate the visual signal light apparatus 105/front facing brake indicator light assembly 2103 in a location that is easily seen by pedestrians, and one that is unlikely to be confused with other lights.

Additional lights might be incorporated into and around the vehicles front grill and emblem. In an effort to further distinguish the visual signal light apparatus 2105/front facing brake indicator light assembly 2103 from the current traditionally placed lights on a vehicle, it is contemplated that the light(s) might be placed along the entire bottom of the windshield. In the alternative, and in keeping with the theme of minimal impact, it is similarly considered that the assembly, instead of being a part of the dashboard, might instead be incorporated into the rear-view mirror.

That said, it may still be desirable to allow for multiple configurations as studies may show that pedestrians are particularly receptive to one configuration over another. Further, vehicle manufacturers may also want to maintain or present a particular aesthetic style with their line of vehicles.

Now referring to FIG. 16, a pictorial illustration of the present invention disclosing a rear view of a visual signal light apparatus and mount. As mentioned above, the same display functionality could be incorporated into an additional digital display 2118 placed on the driver facing or rear portion of the visual signal light apparatus 2105. The information displayed to the driver could be step by step navigation directions. Returning to the notion of serving function to ride-share programs, because the unit is centrally located, it is viewable to a passenger as well. The information that would be relevant to display to this passenger could be information such as welcome signage, ride-share and/or driver identification information, advertising, or other visually communicated information.

Now referring to FIGS. 17 and 18, a pictorial illustration of an embodiment of the present invention disclosing a right and left side view of a visual signal light apparatus comprising an auxiliary cable input 2107. This embodiment of the present invention is an after-market installation and is mounted on the top of the dashboard. This embodiment, in its most un-intrusive installation, is not wired directly into the vehicles electrical system and instead is powered via traditional auxiliary power sources, for example, the ac/cigar lighter power source.

Now referring to FIG. 19, a pictorial illustration of the present invention disclosing a top plan view of a visual signal light apparatus comprising a solar array. The visual signal light apparatus 2105 comprises a power supply in the form of an auxiliary battery which is separate and distinct from the vehicle's factory installed battery, as well as a solar array 2106 to facilitate charging this separate battery.

Now referring to FIG. 20, is a pictorial illustration of the present invention disclosing a bottom plan view of a visual signal light apparatus. The elimination of professional installation or invasive installation is desirable. As such, it may be preferable to have the visual signal light apparatus 2105 be powered by a battery that is independent of the vehicle's factory installed battery. This configuration would allow for the visual signal light apparatus 2105, in combination with the RF technology disclosed above, to be reduced to distinct physical components that would merely require a mechanical attachment by any suitable means, such as a mount 104, stand, or the like by the aftermarket consumer. In an exemplary embodiment, a mount is attached to a dashboard by any suitable means, such as one or more adhesives 2119.

Now referring to FIG. 21, a pictorial illustration of the present invention disclosing a rear perspective view of a visual signal light apparatus and mount. In yet another embodiment, the apparatus 2105 is also comprised of a camera installed 2119 whereby the camera has to recording function to record base on time intervals, vehicle motions, or both. The camera will be forward facing the front of the vehicle as it is installed in the backside of the apparatus.

Now referring to FIG. 22, a pictorial illustration of the present invention disclosing an exploded view of a visual signal light apparatus comprising a front facing brake indicator light assembly and mount. The visual signal light apparatus 2105 comprises at least a main component 21108 and the main component 2108 comprises at least a recessed housing 2109. The recessed housing 2109 comprises at least a rear surface 2110 facing the rear end of a vehicle, a top surface 2111 facing a top of a vehicle, a bottom surface 2112 facing a bottom of a vehicle, and a surrounding wall 2113 surrounding a peripheral of the recessed housing 2109. The main component 2108 further comprises at least a front surface 2114 facing the front end of a vehicle and extending in a transverse direction to terminate at a lateral edge. The front surface 2114 comprises one or more LED light guides 2115. The LED light guides 2115 and LED lights 2116 (or LED array) are connected to and/or housed within the recessed housing 2109. The connection is by any suitable mean, such as, screws, nuts, bolls, adhesives, magnets, and the like. In this embodiment, there will be least 12 circular light guides, each light guide covering the lighting range of at least 12 LED lights. The front surface 2114 and the rear surface 2110 of the main component 2108 are parallel. The LED array within the recessed housing 2109 is positioned between the rear surface 2110 and the front surface 2114. A solar array 2106 (including one or more solar panels or solar cells) is embodied to the top surface 2111 of the main component 2108. A digital display 2118 is embodied to the rear surface 2110 of the main component 2108. The visual signal light apparatus 2105 further comprises a mount component 2104 suitable to mount the main component 2108 to a dashboard of a vehicle via an adhesive 2234 or the like. The recess housing 2109 is secured to the lens 2114 with screws 2231. The screws are covered by plate 2232 to cover the screws for visual appearances. Metal plates 2221 are placed inside the recess housing 2109 and are used for attachment to the magnets 2220 placed inside of the mount component 2104. This allows the main component 2108 to be separable from mount component 2104.

Now referring to FIG. 23, a pictorial illustration of the present invention showing how main component 2105 is separable from mount component 2104.

Now referring to FIG. 24, a pictorial illustration of the present invention showing the controller 2222 of the forward facing brake indicator light 2105. In one embodiment, the controller 2222 is connected to the brake lights of the vehicle and when brake lights are activated the controller 2222 sends a signal to the forward facing brake indicator light 2105. The controller 2222 is linked to the forward facing brake indicator light 2105 via Bluetooth but in other embodiments, the link can be established via infrared technology or radio frequency technology and or any other comparable technology.

Now referring to FIG. 25, a pictorial illustration of the present invention showing the top view of the controller 2222 of the forward facing brake indicator light 2105.

Now referring to FIG. 26, a pictorial illustration of the present invention showing the bottom view of the controller 2222 of the forward facing brake indicator light 2105.

Now referring to FIG. 27, a pictorial illustration of the present invention disclosing an exploded view of controller 2222. Top housing piece 2223 is secured to the bottom housing piece 2228 via two screws 2230. Within the housings is the PCB board 2224 having the CPU and the connector 2225 to the brake lights of the vehicle. The PCB board is adhered to the battery 2227 with an adhesive tape 2226. The controller 2222 is then attached to the surface near the brake light of the vehicle with a Velcro tape 2229.

In particular, it is desirable for motorists who are attempting difficult parking maneuvers to receive warnings in order to avoid collision. While it is now becoming more commonplace for vehicles to come installed with cameras an/or proximity detectors that sound to facilitate parking, in another embodiment of the invention it is disclosed a method for indicating to drivers a visual indicator that collision is imminent. A parking vehicle is contemplated wherein the driver is attempting to reverse into a parking spot and parallel park between two vehicles. The disclosed invention is installed on parked vehicle. As parking vehicle begins to reverse into the parking spot, parked vehicle's motion and/or distance sensors become active. Once parking vehicle is within sufficient distance such that it has crosses a collision distance threshold, the motion and/or distance sensors interact with the visual signal light apparatus 2105 such that the brake light master control system activates the front facing brake indicator light assembly 2103, alerting the parking vehicle that it is too close and needs to stop.

The parking vehicle can also be outfitted with the disclosed invention and attempting parking between two vehicles. The same invention would indicate to the driver that their vehicle is now dangerously close to colliding with the car directly to the vehicle's front, parked vehicle, once the motion and/or distance sensors detected the collision distance threshold had been crossed and collision was imminent.

The visual signal light apparatus 2105 attached to a vehicle can additionally include the capability to communicate wirelessly with a user's smartphone by way of a software installed user interface on said phone. In such an embodiment, it is contemplated, and has been discussed above, that it is likely preferable to minimize the amount of aftermarket wiring that the installation of such a system might require. Further, as has been contemplated and discussed above, the brake light master control system is likely to be receiving input from a multitude of sources, including but not limited to a brake light pedal, the vehicle's onboard gps, a gps system, Bluetooth enabled devices, and a variety of object, motion and distance sensors. As such, it is preferable to instead consider the brake light master control system the central hub for all of these received signals and configure the responses of the system directly with the brake light master control system instead of each of these different input sources individually.

It is further considered that the optimal installation point of the brake light master control system may be in a corner of the engine compartment, the trunk, under a seat, or in another location such that the vehicles overall aesthetic is left unchanged. As such, instead of communicating these setting by way of direct physical interaction the brake light master control system, instead the user only needs to tune and modify the settings of the system by way of their smart phone and the software installed thereupon.

A user would by way of such an interface would be able to not only tune the output that the brake light master control system would send to the vehicle's braking light but in another contemplated embodiment, use this interface to make configurations upstream to the various input sources as well. Such an embodiment would be preferable as it is both practical and desirable for a user to have access to one interface that controls and configures a multitude of systems as opposed to interacting with each system and device separately when tuning and customizing for their particular purposes.

This unit also contemplates the inclusion of a GPS device. The including of a GPS device would allow for the capability for the vehicle to more accurately broadcast the vehicle location. This serves many potential purposes. For the driver, it may be useful in locating the vehicle as to its location in a crowded and full parking lot. As to a rider, it may be useful in better locating the vehicle and driver for pickup. It is contemplated that the GPS device is part of the digital display 2118 on the rear surface 2110 of the recessed housing 2109.

In one embodiment, the invention is installed on and a part of the vehicles rear-view mirror and the visual signal lights are factory installed and embedded into the molding of the rear-view mirror which is facing the front windshield. In this particular embodiment, it is contemplated that nearly all of the previously described functionalities are present, with the exception of a driver or passenger facing screen, as the rear view mirror itself must be preserved on the driver facing surface of the device. However, this particular embodiment may still be desirable as it achieves perhaps the most minimal impact on the vehicles overall aesthetic.

It is also contemplated that the detection of traffic signs may be obstructed, hidden, or non-obvious and warning instructions are then communicated to the driver on the driver facing LED surface of the front facing light unit.

As contemplated, stop signs and other fixed traffic signs could be easily fitted with a beacon. The vehicle itself would be outfitted with a listening receiver. When approaching signage, once the vehicle was within an appropriate triggering radius, the receiver would detect and trigger, then displaying either a non-verbal flashing warning. In the alternate, it would be possible to indicate with greater specificity what sort of sign was being approached, and an approximate distance to the sign.

What is claimed is:

1. A system to enhance vehicle safety, comprising
   a. a vehicle having a front end and a rear end;
   b. at least one visual signal light apparatus positioned in proximity to said front end of the vehicle;
   c. wherein said visual signal light apparatus illuminates when said vehicle is decelerating via its braking system;
   d. wherein said visual light apparatus is comprised of a main component;
   e. wherein said main component is comprised of an elongated recessed housing extending in a transverse direction to terminate at a lateral edge,
   f. wherein said recessed housing is comprised of a rear surface facing said rear end of said vehicle, a top surface facing a top of said vehicle, a bottom surface facing a bottom of said vehicle, and a surrounding wall surrounding a peripheral of said recessed housing;
   g. wherein said main component is further comprised of an elongated front surface facing said front end of said vehicle and extending in a transverse direction to terminate at a lateral edge;
   h. wherein said front surface is comprised of a plurality of LED light guides that are disposed equidistantly and continuously across said front surface;
   i. wherein said front surface is connected to said recessed housing;
   j. wherein said front surface and said rear surface of said main component are parallel;
   k. wherein a plurality of LED lights are housed within said recessed housing between said rear surface and said front surface;
   l. wherein said visual light apparatus is further comprised of a mount component suitable to mount said main component to a dashboard of said vehicle via an adhesive;
   wherein said main component further comprises a plurality of solar cells that are disposed across said top surface to receive sunlight and charge a secondary battery to provide an emergency auxiliary power source to the visual signal light apparatus.

2. The system of claim 1, wherein said visual signal light apparatus is comprised of a power source and a wireless connection module wherein said visual signal light apparatus is controlled by said vehicle via said wireless connection module.

3. The system of claim 1, wherein said vehicle is comprised of a central processing unit that controls said vehicle's functions.

4. The system of claim 1, wherein said visual signal light apparatus is comprised of a power source and a wireless connection module wherein said visual signal light apparatus is controlled by a smartphone of an occupant of said vehicle via said wireless connection module.

5. The system of claim 1, wherein said main component further comprises a LCD display; and wherein said LCD display faces said rear end of said vehicle.

6. The system of claim 1, further comprising a wire means electrically connected to said braking system for providing electrical communication between said plurality of LED lights and said braking system.

7. A forward facing brake indicator light apparatus comprising a main component, a mount component and a controller component wherein said main component is comprised of
   a. an elongated recessed housing extending in a transverse direction to terminate at a lateral edge,
   b. wherein said recessed housing is comprised of a rear surface facing said rear end of said vehicle, a top surface facing a top of said vehicle, a bottom surface facing a bottom of said vehicle, and a surrounding wall surrounding a peripheral of said recessed housing;
   c. wherein said main component is further comprised of an elongated front surface facing said front end of said vehicle and extending in a transverse direction to terminate at a lateral edge;

d. wherein said front surface is comprised of a plurality of LED light guides that are disposed equidistantly and continuously across said front surface;
e. wherein said front surface is connected to said recessed housing;
f. wherein said front surface and said rear surface of said main component are parallel;
g. wherein a plurality of LED lights embedded on a CPB board are housed within said recessed housing between said rear surface and said front surface;
h. wherein a main cpu is embedded on the CPB board that controls the illumination of said led lights;
i. wherein a plurality of metal plates are secured to said recessed housing;
j. wherein said controller component is comprised of a top housing and a bottom housing wherein a CPB board and a battery is housed between said top housing and said bottom housing wherein said CPB board is comprised of a controller cpu and a connector wherein said connector is capable of connecting to any vehicle tail brake lights and said controller cpu is linked to said main cpu via wireless technology wherein said controller cpu sends signal to said main cpu to activate said LED lights when said vehicle tail brake light is activated;
k. wherein said mount component is comprised of a plurality of magnets wherein said main component is mounted and secured to said mount component by a said metal plates are attracted to said magnets by magnetic force;
wherein said main component further comprises twelve circular light guides that are laterally disposed equidistantly and continuously; wherein each of said twelve circular light guides cover each of said LED lights;
wherein said main component further comprises a plurality of solar cells that are disposed on said top surface to receive sunlight and charge a secondary battery to provide an emergency auxiliary power source to the visual signal light apparatus.

* * * * *